US010303637B2

(12) United States Patent
Sasagawa

(10) Patent No.: US 10,303,637 B2
(45) Date of Patent: May 28, 2019

(54) STORAGE SYSTEM INCLUDING A PLURALITY OF STORAGE DEVICES ARRANGED IN A HOLDER

(71) Applicant: Toshiba Memory Corporation, Tokyo (JP)

(72) Inventor: Hiroshi Sasagawa, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 375 days.

(21) Appl. No.: 15/059,113

(22) Filed: Mar. 2, 2016

(65) Prior Publication Data

US 2017/0052917 A1 Feb. 23, 2017

Related U.S. Application Data

(60) Provisional application No. 62/207,765, filed on Aug. 20, 2015.

(51) Int. Cl.
*G06F 13/42* (2006.01)
*G06F 13/40* (2006.01)

(52) U.S. Cl.
CPC ...... *G06F 13/4027* (2013.01); *G06F 13/4265* (2013.01)

(58) Field of Classification Search
CPC .......................... G06F 13/4027; G06F 13/4265
USPC ....................................................... 710/306
See application file for complete search history.

(56) References Cited

U.S. PATENT DOCUMENTS

| | | | | |
|---|---|---|---|---|
| 6,128,750 A * | 10/2000 | Espy | ..................... | G06F 11/201 714/4.12 |
| 6,272,573 B1 * | 8/2001 | Coale | ................... | G11B 33/126 361/727 |
| 7,206,900 B2 * | 4/2007 | Higaki | ..................... | G06F 3/061 711/113 |
| 7,216,192 B2 * | 5/2007 | Boulay | ................. | G06F 3/0605 710/104 |
| 7,452,236 B2 | 11/2008 | Verdiell et al. | | |
| 7,903,683 B1 * | 3/2011 | Felton | ................. | H04L 12/6418 370/242 |
| 2001/0011357 A1 * | 8/2001 | Mori | ........................ | H04L 1/24 714/25 |
| 2003/0041211 A1 * | 2/2003 | Merkey | ............... | G06F 11/1076 711/114 |
| 2003/0182504 A1 * | 9/2003 | Nielsen | ................. | G06F 3/0601 711/114 |
| 2003/0231420 A1 * | 12/2003 | Kano | .................. | G06F 11/3034 360/69 |

(Continued)

FOREIGN PATENT DOCUMENTS

JP 2011070617 A 4/2011

*Primary Examiner* — Christopher B Shin
(74) *Attorney, Agent, or Firm* — Kim & Stewart LLP

(57) ABSTRACT

A storage system includes a holder, and a plurality of storage devices arranged along a line in the holder, each of the storage devices including first and second connection interfaces. Each of the first connection interfaces is electrically connected to a second connection interface of another storage device and each of the second connection interfaces is electrically connected to a first connection interface of another storage device, such that an electrical loop connection is formed through the plurality of storage devices.

20 Claims, 14 Drawing Sheets

(56) References Cited

U.S. PATENT DOCUMENTS

| | | | |
|---|---|---|---|
| 2005/0257232 A1* | 11/2005 | Hidaka | G11B 33/126 720/654 |
| 2006/0248380 A1* | 11/2006 | Nishiyama | G11B 33/126 714/6.12 |
| 2007/0038919 A1* | 2/2007 | Sekiguchi | G06F 11/1044 714/763 |
| 2008/0148303 A1* | 6/2008 | Okamoto | G11B 33/126 720/652 |
| 2016/0028807 A1* | 1/2016 | Yu | H04L 67/1095 709/248 |
| 2017/0109298 A1* | 4/2017 | Kurita | G06F 13/1668 |

* cited by examiner

STORAGE SYSTEM INCLUDING A PLURALITY OF STORAGE DEVICES ARRANGED IN A HOLDER

CROSS-REFERENCE TO RELATED APPLICATIONS

This application is based upon and claims the benefit of priority from U.S. Provisional Patent Application No. 62/207,765, filed on Aug. 20, 2015, the entire contents of which are incorporated herein by reference.

FIELD

Embodiments described herein relate generally to an information processing system, in particular, a storage system including a plurality of storage devices arranged in a holder.

BACKGROUND

An information processing system in which a plurality of devices is arranged in a holder and connected via cables is known.

DETAILED DESCRIPTION

A storage system includes a holder, and a plurality of storage devices arranged along a line in the holder, each of the storage devices including first and second connection interfaces. Each of the first connection interfaces is electrically connected to a second connection interface of another storage device and each of the second connection interfaces is electrically connected to a first connection interface of another storage device, such that an electrical loop connection is formed through the plurality of the storage devices.

The information processing system according to one or more embodiments will be described below, with reference the drawings. In the description below, elements having the same or similar functions are indicated by the same reference symbol, and duplicate descriptions thereof might be omitted.

(First Embodiment)
[1. Configuration of Storage System]
[1.1 Overall Configuration of Storage Apparatus in Storage System]

First, referring to FIG. 1, a storage apparatus 100 included in a storage system 1, according to a first embodiment will be described.

Figure 1:
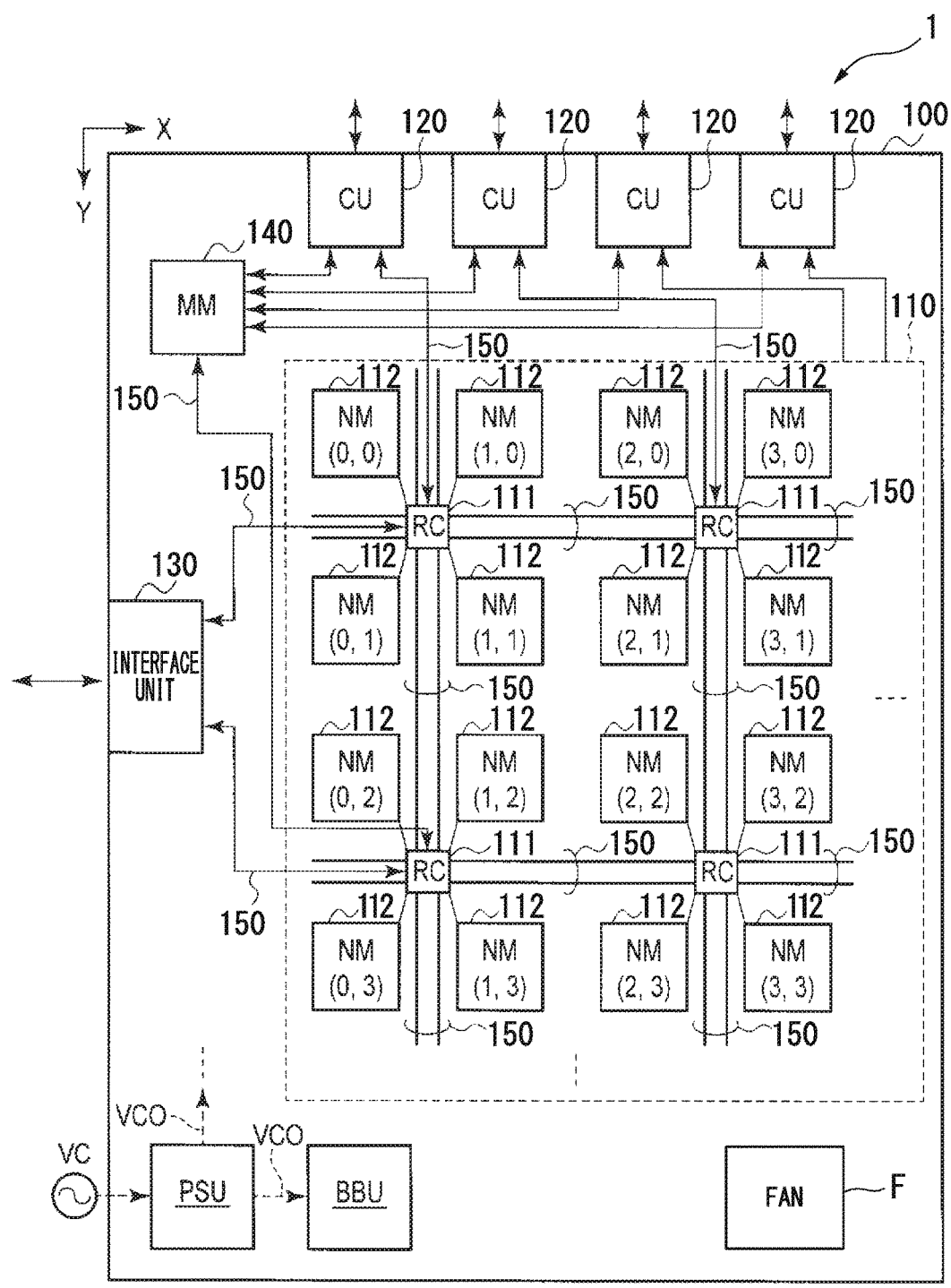
FIG. 1 is a block diagram of a storage apparatus of a first embodiment.

FIG. 1 shows a system configuration of the storage apparatus 100. As shown in FIG. 1, the storage apparatus 100 includes a storage unit 110, connection units (CUs) 120, an interface unit (I/F) 130, a management module (MM) 140, a power supply unit PSU, and an auxiliary power supply unit BBU. The storage apparatus 100, in addition to being an example of an "apparatus," is also an example of a "circuit."

[Storage Unit]

The storage unit 110 has a plurality of routing circuits (RCs) 111 and a plurality of node modules (NMs) 112, disposed in a matrix arrangement. According to this arrangement, the storage unit 110 distributes data into the plurality of node modules 112 and performs distributed and parallel data processing. Here, the disposition in a matrix arrangement means that circuit elements (e.g., routing circuits 111) are disposed at intersections (matrix points) of parallel first lines and parallel second lines.

The routing circuits 111 (path control circuits, routing units), via a mesh network, transfer a packet that includes data from one of the connection units (CUs) 120 and another routing circuit 111, in accordance with a prescribed scheme. A mesh network is a network formed with the plurality of first lines and the plurality of second lines. That is, a mesh network is a network in which the plurality of first lines and the plurality of second lines intersect. Each routing circuit 111 has at least two interfaces 150. Each routing circuit 111 is electrically connected to neighboring routing circuits 111 via interfaces 150. Details of the routing circuits 111 will be described below.

Figure 3:
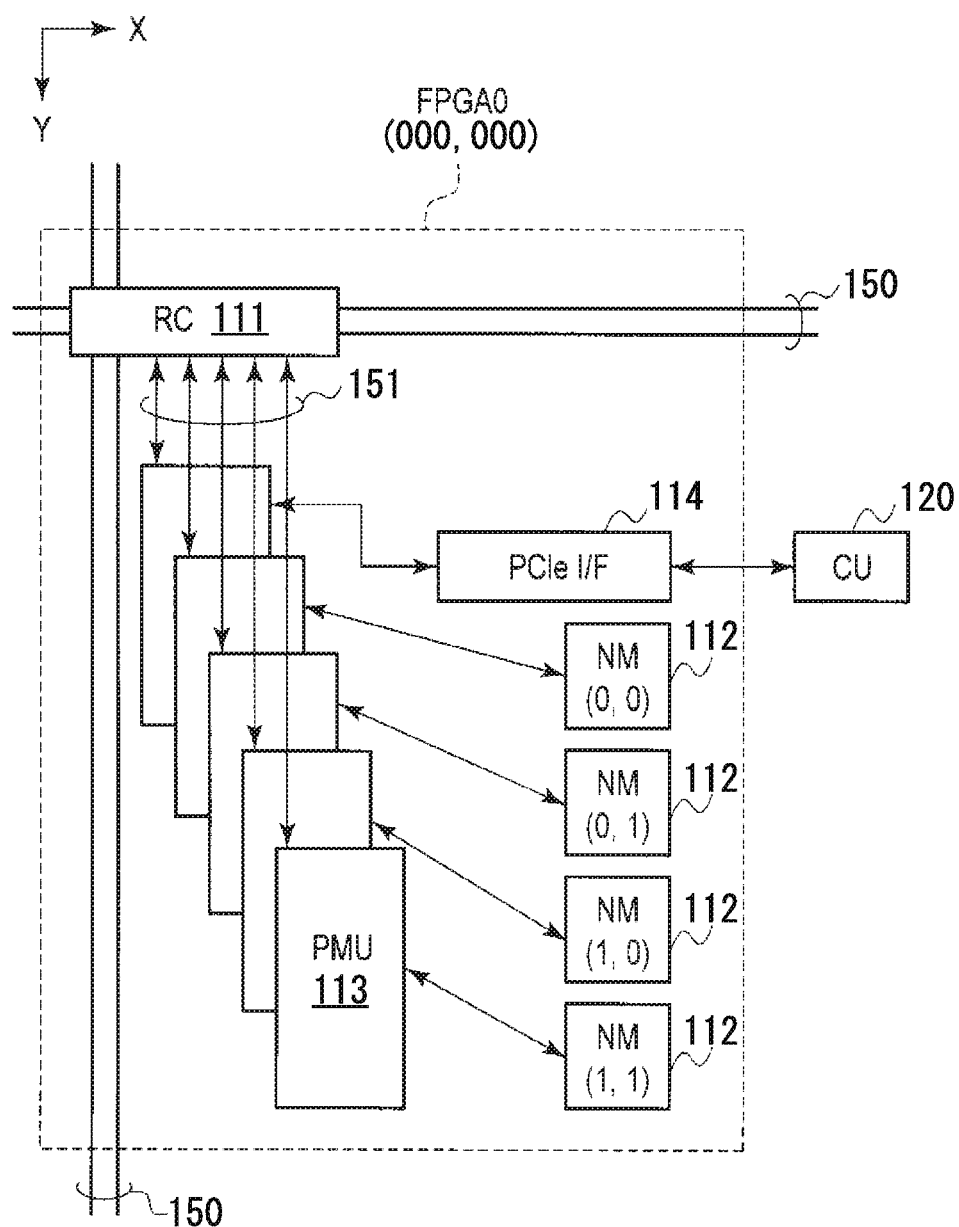
FIG. 3 is a block diagram of an FPGA in the storage apparatus according to the first embodiment.

Each of the node modules (memory units) 112 is electrically connected to neighboring node modules 112 via the corresponding routing circuit 111 and a packet management unit (PMU) (See FIG. 3).

FIG. 1 shows an example of a network in which the node modules 112 are disposed at the matrix points of a logical rectangular matrix. Here, coordinates (x, y) of the matrix points are indicated in decimal notation. Position information of a node module 112 located at a matrix point is indicated by a relative node address (identification address, or communication address) ($x_D$, $y_D$) (in decimal notation), which corresponds to the coordinates of that matrix point. In the example shown in FIG. 1, the node module 112 positioned in the upper-left corner has the origin node address of (0, 0). The node addresses of each of the node modules 112 relative to the origin node address increase and decrease according to the change in the integer values in the horizontal direction (X direction) and the vertical direction (Y direction).

Each node module 112 is connected to a plurality of node modules 112 that are adjacent thereto in at least two different directions. For example, the node module 112 (0, 0) in the upper-left corner, is connected, via a routing circuit 111, to the node module 112 (1, 0) adjacent in the X direction, to the node module 112 (0, 1) adjacent in the Y direction, which is different from the X direction, and to the node module 112 (1, 1) adjacent in the diagonal direction. In the following, the node module 112 indicated by the relative node address ($x_D$, $y_D$) might be simply represented as the node ($x_D$, $y_D$).

Although the node modules 112 are shown as being arranged at matrix points of the logical rectangular matrix in FIG. 1, the arrangement of the node modules 112 is not restricted thereto. That is, it is sufficient that the matrix points be connections of node modules 112 in two more different directions, and in, for example, triangular or hexagonal shape or the like. Also, although the node modules 112 are disposed in two dimensions in FIG. 1, the node modules 112 also can be disposed in three dimensions. If a three-dimensional disposition is employed, each node module 112 can be specified by three coordinate values (x, y, z). If the node modules 112 are disposed in two dimensions, a torus connection is established by joining node modules 112 at opposite sides. A torus connection is a connection state, where a plurality of circuit elements (node modules 112 in this case) is arranged in a first direction and in a second direction different from the first direction, and the plurality of circuit elements arranged in the first direction forms a loop, and a plurality of circuit elements arranged in the second direction forms a loop. The "loop" means that a plurality of circuit element arranged along a given direction (for example, either the first direction or the second direction) has electrical connection with adjacent circuit element(s), and the two circuit elements positioned at the ends in the given direction are electrically connected. That is, the "loop" means that a plurality of circuit elements (or devices) is electrically connected in sequence, and the last circuit element (or device) is electrically connected to the first circuit element (or device). Details of the storage unit 110 will be described below.

[Connection Unit (CU)]

Each of the connection units 120 is electrically connected to a plurality of node modules 112 via an interface 150. Each of the connection units 120 has a connector that can be connected to an external device, operates to store data in the storage unit 110 in accordance with a request or data from the external device (command, address, or the like), and outputs data read out from the storage unit 110 to the external device. The external device is, for example, a server apparatus or a client apparatus provided outside the storage apparatus 100. The connection unit 120 is an example of a "connection circuit" and an example of a "circuit" that assigns coordinates, which will be described below. More specifically, each of the connection units 120 included in a first apparatus 100A (described below) may be an example of a "first circuit." Similarly, each of the connection units 120 included in a second apparatus 100B (described below) may be an example of a "second circuit."

Each of the connection units 120 has a processing module and a storage module. The processing module of the connection unit 120 executes a server application program, using the storage module as a working area. The connection unit 120 processes requests from outside, under the control of the server application. The connection unit 120 accesses the storage unit 110 in the course of processing the requests from outside. When the connection unit 120 accesses the storage unit 110, it generates a packet that can be transferred or executed by the routing circuits 111, and transmits the generated packet to the routing circuit 111.

In FIG. 1, the storage apparatus 100 has four connection units 120. Each of the four connection units 120 has one-to-one connections to different one of the routing circuits 111.

The number of connection units 120 may be arbitrary. A connection unit 120 can be connected to an arbitrary routing circuit 111 of the storage unit 110. One connection unit 120 may be connected to a plurality of routing circuits 111, and one routing circuit 111 may be connected to a plurality of connection units 120. Also, a connection unit 120 may be connected to any one of the routing circuits 111 of the storage unit 110. Details of the connection unit 120 will be described below.

[Interface Unit]

The interface unit 130 is provided for connection with a storage unit 110 of another storage apparatus 100. For example, two physically different storage apparatuses 100 are electrically connected to each other via the interface units 130 thereof. The interface units 130 of a plurality of storage apparatuses 100 are connected, for example, by a cable 300. When the interface units 130 of the storage apparatuses 100 are connected, the storage units 110 of the storage apparatuses 100 are logically linked, and can operate as a single storage unit. At least one routing circuit 111 is electrically connected to the interface unit 130 via one or more interfaces 150. Here, two routing circuits 111 are connected to each of the interfaces 150.

[Management Module (MM)]

The management module 140 is electrically connected to each connection unit 120 and each node module 112. The management module 140 performs status checking and power supply control of all modules within the storage apparatus 100. Specifically, the management module 140 has a base management controller (BMC) (not shown in FIG. 1). The management module 140, as a part of the BMC function, may execute monitoring of the ambient temperature, monitoring and control of the rpm of a fan F that will be described below, monitoring and control of the power supply current and power supply voltage, recording of the status of each of the connection units 120, monitoring of the temperature of each of the connection units 120, and resetting of the connection units 120 and the like.

The management module 140 also, in addition to the base management controller function, executes processing with respect to the storage unit 110 (node module control processing). The type of processing included in the node module control processing may be arbitrarily determined. For example, if a first memory 161, which will be described below, is a NAND flash memory, the management module 140 may execute wear-leveling of the first memory 161. Wear-leveling is an operation to make uniform the number of overwrites among the memory elements. When the management module 140 performs processing with respect to the storage unit 110, the management module 140 issues a packet in accordance with the processing. The management module 140, for example, issues a packet conforming to a scheme indicated by FIG. 5, which will be described below. The management module 140 is an example of a "management circuit," and an example of a "circuit" that sets the coordinates, which will be described below. That is, the management module 140 included in the first apparatus 100A, is an example of the "first circuit." The management module 140 included in the second apparatus 100B is an example of the "second circuit."

[Power Supply Unit (PSU)]

The power supply unit (main power supply unit) PSU supplies power to all modules within the storage apparatus 100. For example, the power supply unit PSU converts an external power supply voltage from an external power source VC to a prescribed DC voltage, and supplies the power supply voltage VCO to the various elements (110, 120, 130, and 140). The external power source VC supplies, for example, 100-V or 200-V AC power. The power supply unit PSU is an example of a "power supply circuit."

[Auxiliary Power Supply Unit (BBU)]

The auxiliary power supply unit (battery apparatus, auxiliary power supply apparatus) BBU stores electrical power in itself by receiving power at the power supply voltage VCO from the power supply unit PSU. If the storage apparatus 100 is electrically cut off from the external power source VC, the auxiliary power supply unit BBU acts as an auxiliary power supply to supply an auxiliary power supply voltage to the various units (110, 120, 130, 140).

[Interface Standards]

In the present embodiment, the standards described below can be applied as an interface that electrically connects the above-described elements.

The low-voltage difference signal standard (LVDS) or the like can be applied to the interface 150 mutually connecting the routing circuits 111.

The PCIe (PCI Express) standard or the like can be applied to the interface 150 electrically connecting the routing circuits 111 and the connection units 120.

The LVDS standard and the JTAG (Joint Test Action Group) standard or the like can be applied to the interface 150 that electrically connects the routing circuits 111 and the interface unit 130.

The PCIe standard and the I2C (Inter-integrated Circuit) standard or the like can be applied to the interface 150 that electrically connects the node modules 112 and the management module 140.

These standards are examples and, other standards may be applied as necessary.

[1.2 Configuration of Storage Unit 110]

Next, an example of the configuration of the storage unit 110 will be described, using FIG. 2.

Figure 2:
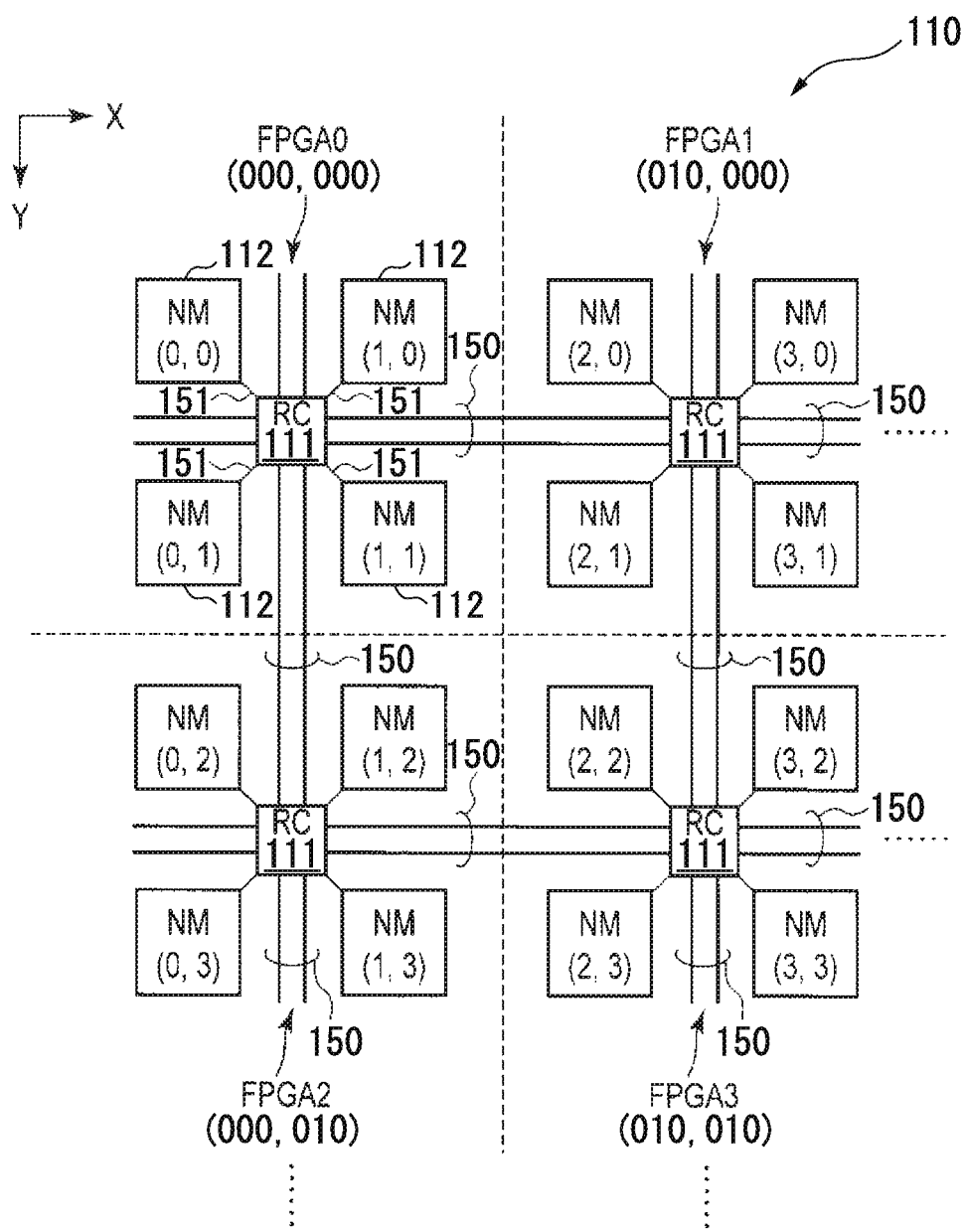
FIG. 2 is a block diagram of a storage unit in the storage apparatus according to the first embodiment.

As shown in FIG. 2, the storage unit 110 has a plurality of FPGAs (field-programmable gate arrays). Each of the FPGAs has one routing circuit 111 and four node modules 112. In FIG. 2, the four FPGAs from FGPA0 to FGPA3 are shown as an example. For example, the FPGA0 has one routing circuit 111 and four node modules, namely node module (0, 0), node module (1, 0), node module (0, 1), and node module (1, 1).

The addresses of each of the four FPGAs are, for example, (000, 000), (010, 000), (000, 010), and (010, 010) when expressed in binary notation.

In each FPGA, one routing circuit 111 and four node modules 112 are electrically connected through the interfaces 151, via a packet management unit PMU (See FIG. 3).

[1.3 Configuration of FPGA]

Next, a configuration of the FPGA will be described, with reference to FIG. 3. In this case, FGPA0 in FIG. 2 will be taken as an example in the description.

As shown in FIG. 3, FGPA0 has one routing circuit 111, four node modules 112, five packet management units (PMU) 113, and a connection unit interface (PCIe interface) 114.

The packet management units (packet control circuits) 113 are provided in correspondence to the connection unit 120 and the four node modules 112, analyze packets from the connection unit 120 and the routing circuits 111, and, if the coordinates (relative node address, that is, the identification address and communication address) coded in the analyzed packet coincide with its own coordinates, transmit that packet directly to the corresponding node module 112. If, however, the coordinates coded in the analyzed packet do not coincide with its own coordinates (that is, if they are different coordinates), the packet management units 113 returns that notification to the routing circuit 111.

For example, if the node address of the ultimate target position is (3, 3), the packet management unit 113 connected to the node address (3, 3) determines that the coordinates (3, 3) coded in the interpreted packet coincides with its own coordinates (3, 3). Then, the packet management unit 113 connected to the node address (3, 3) transmits the analyzed packet to the node module 112 connected to itself at the node address (3, 3). Non-illustrated node controller (NC) of the node module 112 performs prescribed processing, based on the request in the packet, such as stored into a non-volatile memory in the node module 112.

The connection unit interface (PCIe interface) 114 analyzes requests, packets, and the like from the connection unit 120 and also transmits analyzed requests, packets, and the like to the packet management unit 113. A transmitted packet is transferred to another node module 112 via a routing circuit 111.

[1.4 Configuration of Node Module (NM)]

Figure 4:
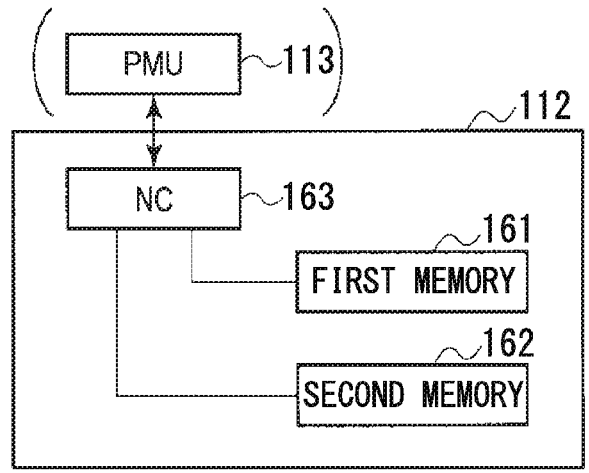
FIG. 4 is a block diagram of a node module in the storage apparatus according to the first embodiment.

Next, a configuration of the node module 112 will be described, using FIG. 4. Here, the node module (0, 0) 112 will be taken as an example in the description.

As shown in the drawing, the node module (0, 0) 112 has a node controller 163, a first memory 161 that functions as a storage memory (non-volatile memory into which information is stored), and a second memory 162 that is used by the node controller 163 as a working area.

The node controller 163 is electrically connected to the corresponding packet management unit 113. The node controller 163 may receive a packet via the packet management unit 113 from the connection unit 120 or from another node module 112, and transmit a packet via the packet management unit 113 to the connection unit 120 or to another node module 112. If the packet addressee is its own node module 112, the node controller 163 executes processing corresponding to that packet (a command recorded in that packet). For example, if the command is an access command (read command or write command), the node controller 163 accesses the first memory 161. If the addressee of the received packet is not its own node module 112, the node controller 163 transfers that packet to another node module 112 connected thereto.

A NAND flash memory (hereinafter, NAND memory), a bit cost scalable (BiCS) memory, a magnetoresistive memory (MRAM), a phase-change memory (PcRAM), a resistance random-access memory (RRAM (registered trademark), or a combination thereof can be used as the first memory 161.

Various types of RAM, such as a DRAM (dynamic random-access memory) can be used as the second memory 162. If the first memory 161 provides the function of a working area, the second memory 162 need not be provided in the node module 112.

[1.5 Packet Content]

Next, content of a packet will be described with reference to FIG. 5.

Figure 5:
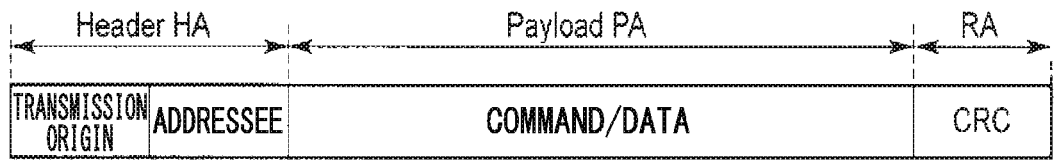
FIG. 5 shows a configuration of a packet communicated in the storage apparatus according to the first embodiment.

As shown in FIG. 5, a packet according to the first embodiment has a header area HA, a payload area PA, and a redundancy area RA.

In the header area HA, the X-direction and Y-direction addresses (from_x, from_y) of the transmission origin and the X-direction and Y-direction addresses (to_x, to_y) of the transmission destination are coded. The term "address" means the same as the above-described coordinates (identification address, communication address) and the term "addressee" means the node at the destination address.

In the payload area PA, a command, data or the like is coded. The data size of the payload area PA is variable.

In the redundancy area RA, a CRC (cyclic redundancy check) code is coded. The CRC code is a code (information) used to detect data errors in the payload area PA.

Upon receiving a packet of such a configuration, the routing circuit 111 determines the routing destination, in accordance with a prescribed transfer algorithm. In accordance with the transfer algorithm, the packet is transferred through the routing circuits 111 and ultimately reaches the node module 112 of the destination node address.

For example, the routing circuit 111, in accordance with the transfer algorithm, determines, as intermediary node modules 112, node modules 112 on the path that has the minimum number of transfers from its own node module 112 to the addressee node module 112. If there is a plurality of paths having the minimum number of transfers from its own node module 112 to the addressee node module 112, the routing circuit 111 selects one of the paths, using an arbitrary method. In the same manner, if there is a defective or busy node module 112 on the path, the routing circuit 111 selects a different node module 112 as the intermediary node module.

In the storage unit 110, a plurality of node modules 112 is logically connected in a mesh network configuration. For this reason, there may be a plurality of paths each having a minimum number of packet transfers. In such cases, if a plurality of packets designating a specific node module 112 as a destination is issued, the plurality of issued packets may be distributed among the paths in accordance with the transfer algorithm. This avoids the concentration of accesses with respect to a specific node module 112 and suppresses a reduction in the overall throughput of the storage system 1.

[1-6. Configuration of Connection Unit]

Next, a configuration of the connection unit 120 will be described with reference to FIG. 6.

Figure 6:
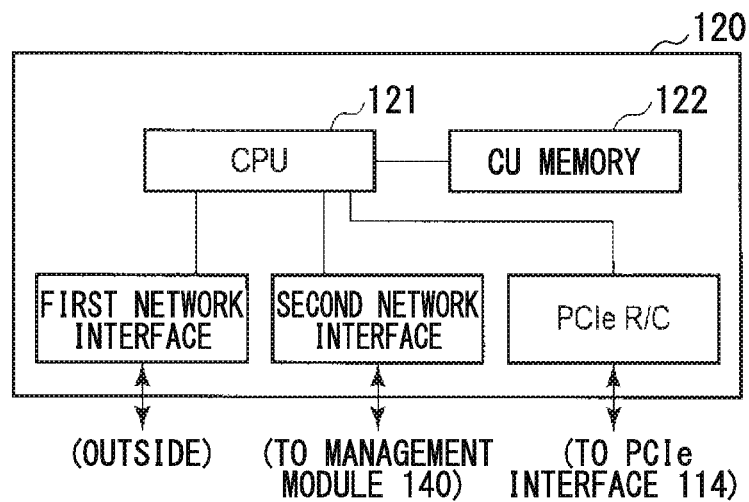
FIG. 6 is a block diagram of a connection unit in the storage apparatus according to the first embodiment.

As shown in FIG. 6, the connection unit 120 has, for example, a CPU (central processing) 121 and CU memory 122.

The CPU (control circuit, processing circuit) 121 controls the storage unit 110 in accordance with requests (commands, addresses, or the like) from outside, via a connector that is configured to be connected to an external device. The CPU 121 executes a server application program, using the CU memory 122 as a working area. Specifically, the CPU 121 processes requests from outside, in accordance with the server application program. When accessing the storage unit 110, the CPU 121 generates a packet that can be transferred or executed by the routing circuits 111, and transmits the generated packet to the routing circuit 111 connected to its own connection unit 120.

The CU memory 122 is used as the working area of the CPU 121. A volatile semiconductor memory such as DRAM, SRAM, or the like can be used as the CPU memory 122, although the type of the CU memory 122 is not restricted thereto.

[2. Configuration of Storage Apparatus Hardware]

Next, a hardware configuration of the storage apparatus 100 will be described.

Figure 7:
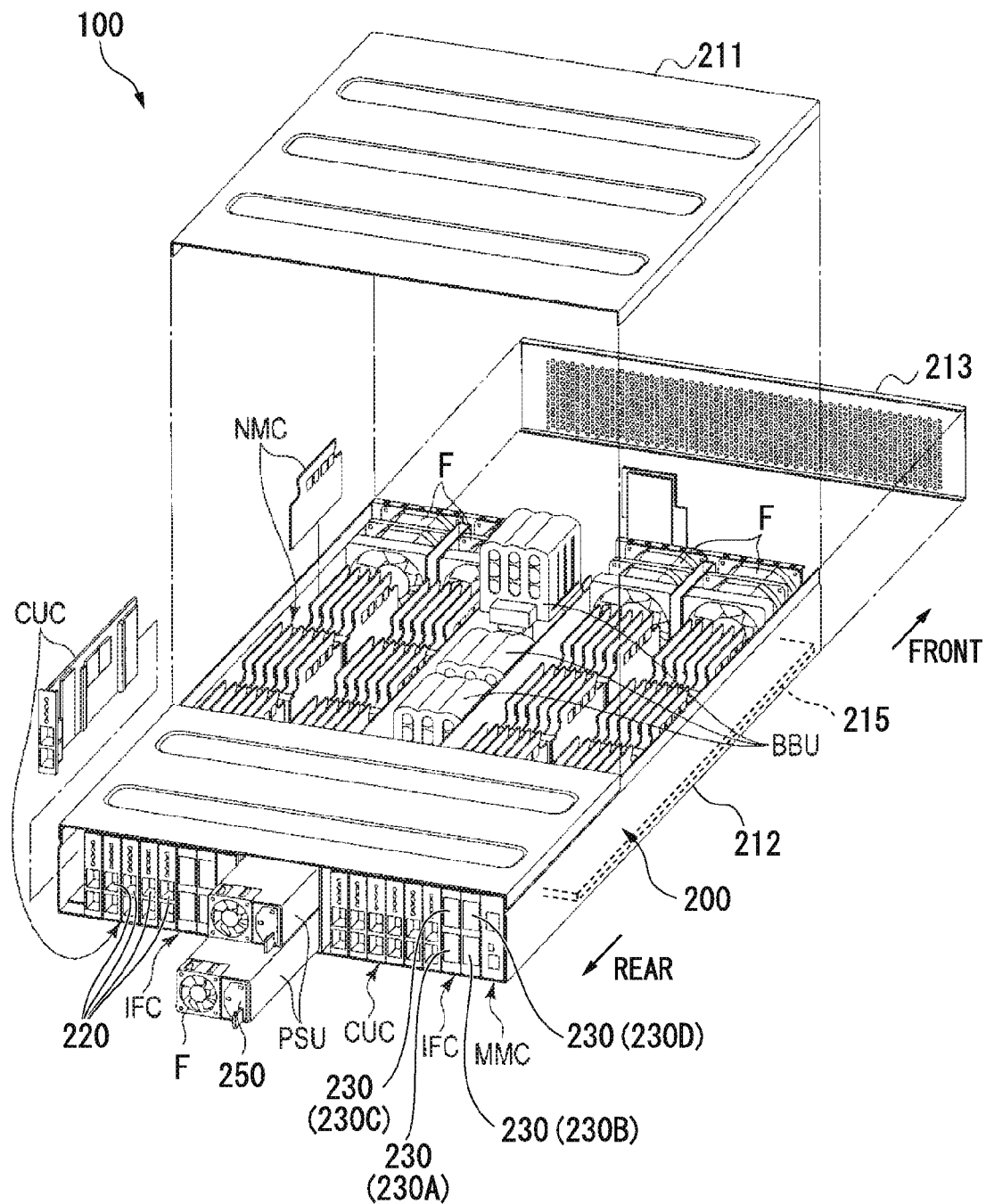
FIG. 7 is an exploded view of the storage apparatus according to the first embodiment.

FIG. 7 is a partial exploded view of the storage apparatus 100. The storage apparatus 100 has an enclosure (cabinet, case) 200 that houses various components of the storage apparatus 100. The enclosure 200 is housed in a rack R (See FIG. 10), which is an example of a housing.

[2-1. Enclosure]

Next, components housed in the enclosure 200 will be described with reference to FIG. 7.

As shown in FIG. 7, the enclosure 200 houses node module cards (NMCs), connection unit cards (CUCs), interface cards (IFCs), management module cards (MMCs), power supply units (PSUs), auxiliary power supply units (BBUs), and fans F. The enclosure 200 is formed by assembling enclosure members 211, 212, and 213.

For example, two enclosure members 211 and 212 are disposed in a stacking direction of the rack R, so as to cover both sides of the above-described components of the storage apparatus 100 and fixed to each other by prescribed screw fastening. The remaining enclosure member 213 is disposed so as to cover the front side of the components of the storage apparatus 100 and forms the front side of the enclosure 200. The enclosure member 213 is fixed to the enclosure members 211 and 212 by prescribed screw fastening or the like. This forms the enclosure 200 in a box shape.

[2-2. Node Module Cards]

Each of the node module cards (NMCs) is a card-type module, in which the node module 112, the node controller 163, the routing circuit 111, the packet management unit 113, and the connection unit interface (PCIe interface) 114 are mounted on a prescribed board (circuit board). The node module cards are attached to connectors provided on a backplane 215 of the enclosure 200 and, for example, are supported substantially upright with respect to the backplane 215. The plurality of node module cards, by being mutually electrically connected via the connectors, forms the storage unit 110. Each node module card is an example of a "circuit element" and also an example of a "memory module (data storage module)."

The electrical connection relationship of the node module cards will be described below.

Figure 8:
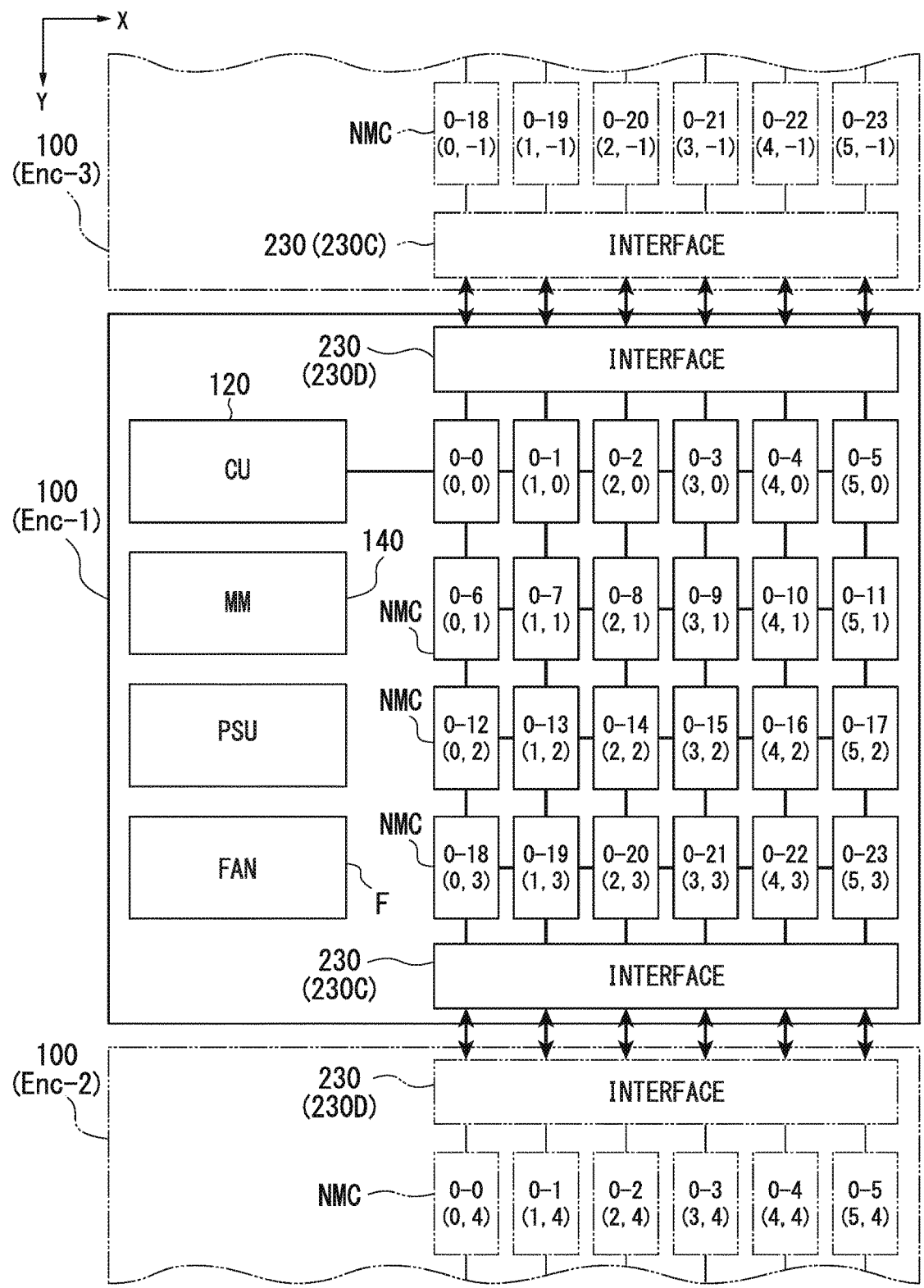
FIG. 8 schematically illustrates connection relationship among node module cards in a plurality of storage apparatuses according to the first embodiment.

FIG. 8 shows the electrical connection relationship of the node module cards. As shown in FIG. 8, the plurality of node module cards is connected in a matrix configuration. The connection in the "matrix configuration" means that each of the node module cards is connected in a plurality of directions. That is, the connection in the matrix configuration is one in which one node module card is electrically connected to adjacent node module cards in a first direction with respect (for example, the X direction) and also electrically connected to adjacent node module cards in a second direction (for example, the Y direction) that is different from the first direction.

In the present embodiment, the node module cards is electrically connected in a loop form, and forms a torus. The "torus" means that, as described above, a plurality of node module cards arranged along a first direction forms a loop and a plurality of node modules cards arranged along a second direction that is different from the first direction forms al loop. The "loop" means, for example, a plurality of circuit elements (node module cards) arranged along a given direction (for example, a first direction or a second direction)

is electrically connected in series, and the two circuit elements positioned at both ends in that direction are also electrically connected.

For example, 24 node module cards are arranged as shown in FIG. 8. The number of node module cards is however not restricted to 24.

In FIG. 8, 24 node module cards are arranged separately in six columns in the X direction and four rows in the Y direction. The 0-0, 0-1, and so on in FIG. 8 are card numbers assigned to each of the node module cards as a convenience of description. The (0, 0), (0, 1) and so on in FIG. 8 indicate the coordinates (identification addresses, communication addresses) assigned to each node module card. As shown in FIG. 8, each node module card has a unique X coordinate and Y coordinate. The coordinates (identification addresses, communication addresses) of each node module card are, for example, automatically assigned by the management module 140. The coordinates of each node module card may be assigned by a connection unit 120. Details of the assignment of the coordinates will be described below.

To form a torus by the node module cards, in each row the node module card having the minimum X coordinate value (0, 0) and the node module card having the maximum X coordinate value (5, 0) are electrically connected, and in each column the node module card having the minimum Y coordinate value (0, 0) and the node module card having the maximum Y coordinate value (0, 3) are electrically connected. As a result, toroidal electrical connection paths are formed, and all node module cards are electrically connected.

More specifically, for example, the XY coordinates of the node module card having the number 0-0 is set to (0, 0). In the node module card electrical connection direction, the direction from the number 0-0 node module card toward the number 0-1 node module card is set as the positive X direction, and the opposite direction is set as the negative X direction. Similarly, in the node module card electrical connection direction, the direction from the number 0-0 node module card toward the number 0-6 node module card is set as the positive Y direction, and the opposite direction is set as the negative Y direction. Unique coordinates that are combinations of integers are assigned as XY coordinates to all node module cards.

In the present embodiment, an electrical loop in the X-direction is formed within one storage apparatus 100. If a new storage apparatuses 100 is connected to an existing storage apparatus 100, the new storage apparatus 100 is connected in the Y direction.

Specifically, the negative X-direction terminal of the 0-0 node module card and the positive X-direction terminal of the 0-5 node module card are electrically connected. In the same manner, each of the 0-6 node and the 0-11 node module cards, the 0-12 and the 0-17 node module card, and the 0-18 and the 0-23 node module cards is connected in the X direction, and thus loop electrical connection paths in the X direction are formed within the storage apparatus 100.

As to the Y direction, if there is no additional storage apparatus 100, the negative Y-direction terminal of the 0-0 node module card and the positive Y-direction terminal of the 0-18 node module card are connected. In the same manner, each of the 0-1 and the 0-19 node module cards, the 0-2 and the 0-20 node module cards, the 0-3 and the 0-21 node module cards, the 0-4 and the 0-22 node module cards, and the 0-5 and the 0-23 node module cards is electrically connected. The node module cards that are positioned at each end in the positive Y direction and the negative Y direction are connected to the interface cards 230 (230C and 230D).

As shown in FIG. 8, if a plurality of storage apparatuses 100 is connected, the storage apparatuses 100 is connected in the Y direction (positive Y direction or negative Y direction) via the interface cards.

For example, a device number 1 (Enc-1) is assigned to the first storage apparatus 100, and a device number 2 (Enc-2) is assigned to the added storage apparatus 100. The storage apparatus 100 (Enc-2) is then connected to the storage apparatus 100 (Enc-1) in the positive Y direction. In this case, the positive Y-direction terminal of the node module card 0-18 of the storage apparatus 100 (Enc-1) is electrically connected to the negative Y-direction terminal of the node module card 0-0 of the storage apparatus 100 (Enc-2). In the same manner, the node module card 0-19 to the node module card 0-23 of the storage apparatus 100 (Enc-1) are electrically connected, respectively, to the node module card 0-1 to the node module card 0-5 of the storage apparatus 100 (Enc-2). The above-described connection among the plurality of node module cards is established by connecting the interface cards of the two storage apparatuses 100 using cables 300, which will be described below.

If, for example, a storage apparatus 100 is further added, the device number 3 (Enc-3) is assigned to the storage apparatus 100. Here, it is assumed that the storage apparatus 100 (Enc-3) is connected in the negative Y direction of the storage apparatus 100 (Enc-1). That is, the negative Y-direction terminal of the node module card 0-0 of the storage apparatus 100 (Enc-1) is electrically connected to the positive Y-direction terminal of the node module card 0-18 of the storage apparatus 100 (Enc-3). In the same manner, the node module card 0-1 to the node module card 0-5 of the storage apparatus 100 (Enc-3) are electrically connected, respectively, to the node module card 0-19 to the node module card 0-23 of the storage apparatus 100 (Enc-3). The above-described connection among the plurality of node module cards is established by connecting the interface cards of the two storage apparatuses 100 using cables 300, which will be described below. The storage apparatus 100 (Enc-3) may be also connected in positive Y direction to the storage apparatus 100 (Enc-2).

[2-3. Connection Unit Cards (CUCs)]

Each of the connection unit cards is a card-type module, in which the connection unit (CU) is mounted on a pre-scribed circuit board. A connection unit card may also be referred to as a "processing device (processing circuit)." As shown in FIG. 7, the connection unit cards are inserted into the enclosure 200 in a substantially horizontal direction from the rear side of the enclosure 200 and attached to connectors. The plurality of connection unit cards is arranged adjacent to each other.

A connection unit card has six pairs of connectors 220 for connection to the outside thereof, that is, 12 connectors 220 in total. A connector conforming to the Ethernet® standard will be described as an example of a standard of the connectors 200. However, an arbitrary standard can be adopted for the connectors 220, as long as it enables network connection.

[2-4. Interface Cards (IFCs)]

Each of the interface card is a card-type module, in which the interface unit 130 is mounted on a prescribed circuit board. The interface card may also be referred to as an "inter-device connection module." The interface cards are inserted into the enclosure 200 in a substantially horizontal direction from the rear side of the enclosure 200 and attached to connectors and are arranged adjacent to each other. The plurality of interface cards may be mutually electrically connected via connectors.

An interface card has four pairs of connectors 230 for connecting itself to the outside (another storage apparatus 100), that is, eight connectors 230 in total. An arbitrary standard may be adopted for the connectors 230. In this case, the LVDS is adopted as the interface 150 between node modules 112, and the LVDS is adopted as the standard for the connectors 230. A plurality of node module cards is electrically connected to each of the connectors 230. In the present disclosure, "electrically connected" includes a case in which a connector 230 is electrically connected to a plurality of circuit elements (for example, node module cards) via other circuit elements, such as an intervening interface 150 or routing circuit 111. That is, "electrically connected" means that electrical signal can flow.

In this case, the interface card connectors 230 in the interface card include a positive X-direction connector 230A, a negative X-direction connector 230B, a positive Y-direction connector 230C, and a negative Y-direction connector 230D. If a storage apparatus 100 is to be added in the positive X direction, the positive X-direction connector 230A is connected via a cable 300 with the negative X-direction connector 230B of the storage apparatus 100 to be added. In the same manner, if a storage apparatus 100 is to be added in the negative X direction, the negative X-direction connector 230B is connected via a cable 300 with the positive X-direction connector 230A of the storage apparatus 100 to be added. If a storage apparatus 100 is to be added in the positive Y direction, the positive Y-direction connector 230C is connected via a cable 300 with the negative Y-direction connector 230D of the storage apparatus 100 to be added, and if a storage apparatus 100 is to be added in the negative Y direction, the negative Y-direction connector 230D is connected via a cable 300 with the positive Y-direction connector 230C of the storage apparatus 100 to be added. In the present embodiment, because a plurality of storage apparatuses 100 is expanded in the positive Y direction and the negative Y direction, and a plurality of storage apparatuses 100 is electrically connected, using the positive Y-direction connector 230C and the negative Y-direction connector 230D.

In this case, the positive Y-direction connector 230C is an example of a "positive-direction connector" and is also an example of a "first-type terminal." The negative Y-direction connector 230D is an example of a "negative-direction connector" and is also an example of a "second-type terminal." The "positive-direction connector" is one that is connected to a negative-direction connector of another apparatus, making a logical connection of the two apparatuses in the positive direction. The "logical connection in the positive direction" means, for example, that is possible to set the coordinates (identification addresses, communication addresses) of circuit elements (for example, node module cards) included in two apparatuses continuously in the positive direction (logical positive direction, for example, the direction in which the value of the coordinate increases). The "negative-direction connector" is one that is connected to a positive-direction connector of another apparatus, making a logical connection of the two apparatuses in the negative direction. The "logical connection in the negative direction" means, for example, that is possible to set the coordinates (identification addresses, communication addresses) of circuit elements (for example, node module cards) included in the two apparatuses continuously in the negative direction (logical negative direction, for example, the direction in which the value of the coordinate decreases). In FIG. 8, the interface (interface card) of the storage apparatus 100 (Enc-1) at the bottom corresponds to the positive Y-direction connector 230C, and the interface (interface card) of the storage apparatus 100 (Enc-1) at the top corresponds to the negative Y-direction connector 230D. By electrically connecting the positive Y-direction connector 230C of a storage apparatus 100 with the negative Y-direction connector 230D of another storage apparatus 100, packets that include data to be stored in the node module cards can be transferred.

[2-5. Management Module Card (MMC)]

The management module card (MMC) is a card-type module, in which the management module (MM) 140 is mounted on a prescribed circuit board. The management module 140 may also be referred as a "management device." As shown in FIG. 7, the management module cards are inserted into the enclosure 200 in a substantially horizontal direction from the rear side of the enclosure 200, and attached to connectors.

[2-6. Power Supply Unit (PSU) and Auxiliary Power Supply Unit (BBU)]

The power supply unit converts an external power supply voltage applied from an external power source VC via a power supply connector 250 to a prescribed DC voltage, and applies the power supply voltage VCO to various components. In this case, two power supply units PSU are inserted into the enclosure 200 from the rear side thereof.

Each storage apparatus 100 has a prescribed fan F. By operating the fan F, air is blown, so that it is possible to dissipate heat generated by the power supply unit and the like. Because the fan F causes airflow within the enclosure 200, all of the components housed in the enclosure 200 can be cooled.

The auxiliary power supply units BBU are arranged in a line in a center region of the enclosure 200. Here, three auxiliary power supply units BBU are disposed. The auxiliary power supply apparatuses themselves store electrical energy by receiving the power supply voltage VCO from the power supply unit PSU as described the above. The auxiliary power supply units BBU then act as auxiliary power sources to supply to the various elements a prescribed auxiliary power supply voltage when the power supply unit PSU is electrically separated from the external power source VC.

[2-7. Example of Use of the Storage Apparatus]

Figure 9:
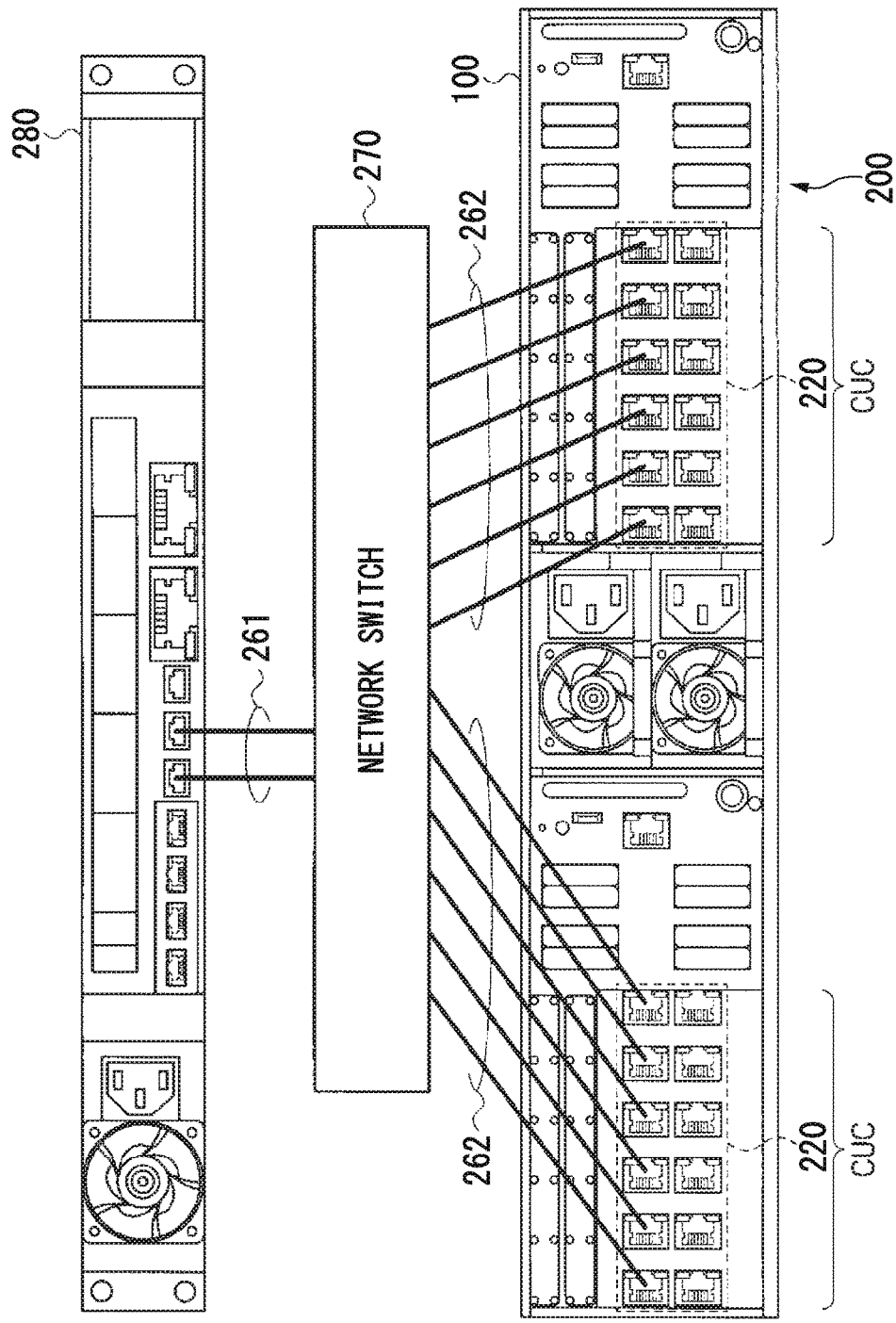
FIG. 9 is a rear view of an enclosure of the storage apparatus according to the first embodiment.

Next, a use example of the storage apparatus 100 will be described, with reference to FIG. 9. FIG. 9 shows connection of the storage apparatus 100 to the other apparatus.

As shown in FIG. 9, the storage apparatus 100 is electrically connected to an external device 280 (for example, a server apparatus or a client apparatus) via the connectors 220 of the connection unit cards, a network switch 270, and cables 261 and 262. In this use example, in the storage apparatus 100, the connection unit cards analyze requests from the external device 280 and accesses the storage unit 110. A server application program is executed in the connection unit cards. The external device 280 can transmit requests that are compatible with the server application program.

[3. Storage System]

Next, the storage system 1 of the present embodiment will be described.

The storage system 1 of the present embodiment includes a plurality of the storage apparatuses 100 that is electrically connected to each other. The storage system 1 also includes a plurality of cables 300 that electrically connect the storage apparatuses 100. An information processing system according to the present embodiment can be not only a storage system, but also a server or the like. In the following, the storage apparatus 100 will be referred to simply as the "apparatus 100," the positive Y-direction connector 230C will be referred to simply as the "positive-direction connector 230C," and the negative Y-direction connector 230D will be referred to simply as the "negative-direction connector 230D."

[4. Cable Connection Method]

Next, an example of the connection of the plurality of apparatuses 100 using the cables 300 will be described.

Figure 10:
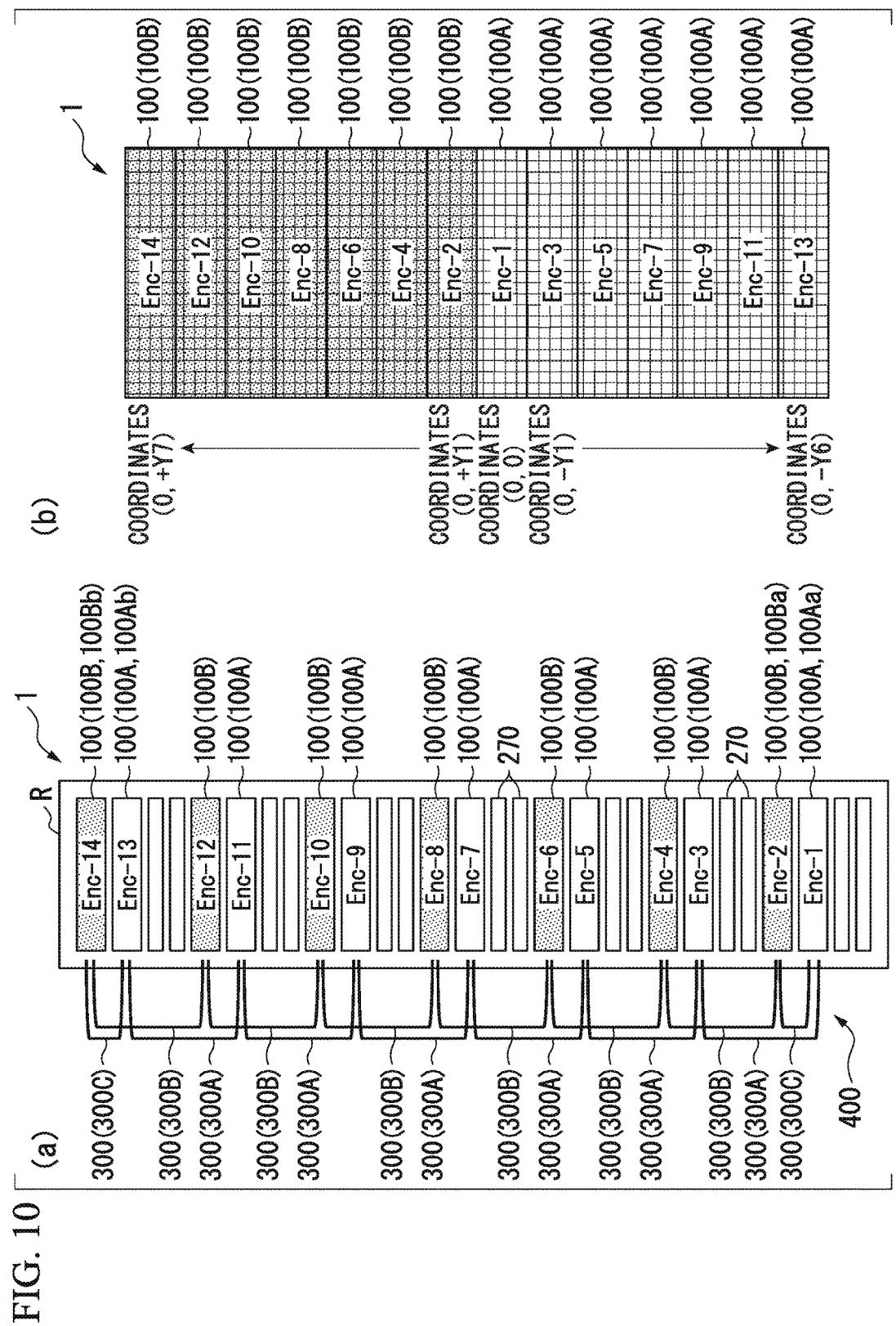
FIGS. 10 and 11 schematically illustrate physical and electrical connection relationship among the plurality of storage apparatuses according to the first embodiment.

FIG. 10 shows the connection relationship among the apparatuses 100. In FIG. 10, (a) shows physical location of the apparatuses 100 in a rack R, and (b) shows the logical connection relationship (electrical connection relationship) among the apparatuses 100. The "Enc-1", "Enc-2", and so on in FIG. 10 refer to the apparatus 100 (Enc-1), the apparatus 100 (Enc-2), and so on. The "device number" is a serial number that is assigned to (and set in) each apparatus 100, for the purpose of setting the coordinates (identification addresses, communication addresses) of a plurality of node module cards of each apparatus 100.

As shown in (a) of FIG. 10, the plurality of apparatuses 100 is housed in the rack R. The apparatuses 100 are arranged in a column, in a prescribed direction (the direction of arrangement of the housing parts of the rack, for example, the vertical direction). That is, the apparatuses 100 are arranged in a straight line along a prescribed direction. "Arranged in a straight line" can also be referred to as being "arranged in one line" or "arranged successively along a straight direction." "Arranged in a straight line" is, for example, the successive arrangement of a plurality of apparatuses in the up-down direction or the successive arrangement of a plurality of apparatuses in the horizontal direction.

In the present embodiment, the plurality of apparatuses 100 is arranged in the rack R in the order of the device number, starting from one end (for example, the bottom end or top end) thereof, without intervening breaks. "Arranged without intervening breaks" means that there is no space for the apparatus 100 between two adjacent apparatuses 100.

As shown in (a) of FIG. 10 of the present embodiment, the plurality of apparatuses 100 includes a plurality of first apparatuses 100A and a plurality of second apparatuses 100B. Here, the first apparatuses 100A are apparatuses with odd device numbers, and the second apparatuses 100B are apparatuses with even device numbers. Alternatively, apparatuses with even device numbers may be the first apparatuses 100A and those with odd device numbers may the second apparatuses 100B. The first apparatuses 100A and the second apparatuses 100B have, for example, the same configuration and functions.

As shown in (a) of FIG. 10, the plurality of apparatuses 100 is arranged in the rack R in the order of the device number, starting from one end (for example, the bottom part or top part) thereof, without intervening breaks. As a result, the plurality of first apparatuses 100A (odd device numbers) and the plurality of second apparatuses 100B (even device numbers) are disposed alternately in the prescribed direction.

In the present embodiment, the plurality of cables 300 includes a plurality of first cables 300A and a plurality of second cables 300B.

Each of the first cables 300A connects the positive-direction connector 230C of one of the first apparatuses 100A and the negative-direction connector 230D of another first apparatus 100A. That is, each of the first cables 300A skips (straddles) one of the second apparatuses 100B positioned between two first apparatuses 100A connected thereby, that is, the first cable 300A is electrically connected only to the first apparatuses 100A. As a result, the first cables 300A electrically connect the first apparatuses 100A in series, so that a packet can be transferred successively in the first apparatuses 100A.

Each of the plurality of second cables 300B connects the positive-direction connector 230C of one second apparatus 100B and the negative-direction connector 230D of another second apparatus 100B. That is, each of the second cables 300B skips (straddles) one of the first apparatuses 100A positioned between two of the second apparatuses 100B connected thereby, that is, the second cable 300B is electrically connected only to the second apparatuses 100B. As a result, the second cables 300B electrically connect the second apparatuses 100B in series, so that a packet can be transferred successively in the second apparatuses 100B.

The plurality of first apparatuses 100A includes a first apparatus 100Aa (for example, the apparatus 100 (Enc-1)) positioned at one end of the first apparatuses 100A in the prescribed direction. In the same manner, the plurality of second apparatuses 100B includes a second apparatus 100Ba (for example, the apparatus 100 (Enc-2)) positioned at one end of the second apparatuses 100B in the prescribed direction. The first apparatus 100Aa and second apparatus 100Ba are mutually neighboring. "Mutually neighboring" means that the plurality of apparatuses 100 is adjacent to each other, and a partition of the rack R or another component (for example, the network switch 270) may be positioned between the two apparatuses 100. As shown in (a) of FIG. 10, the "Ether switch," which is the network switch 270 is disposed between the two adjacent apparatuses 100 (for example, the apparatus 100 (Enc-2) and the apparatus 100 (Enc-3)).

In addition, the plurality of cables 300 includes two third cables 300C. One third cable 300C connects the positive-direction connector 230C (or the negative-direction connector 230D) of the first apparatus 100Aa to the negative-direction connector 230D (or the positive-direction connector 230C) of the second apparatus 100Ba.

The plurality of first apparatuses 100A further includes a first apparatus 100Ab (for example, the apparatus 100 (Enc-13)) positioned at the other end of the first apparatuses 100A in the prescribed direction. In the same manner, the plurality of second apparatuses 100B includes a second apparatus 100Bb (for example, the apparatus 100 (Enc-14)) positioned at the other end of the second apparatuses 100B in the prescribed direction. The first apparatus 100Ab and the second apparatus 100Bb are mutually neighboring. The other third cable 300C connects the negative-direction connector 230D (or the positive-direction connector 230C) of the first storage apparatus 100Ab to the positive-direction connector 230C (or the negative-direction connector 230D) of the second apparatus 100Bb. As a result, the plurality of apparatuses 100 is connected in a loop form. That is, the plurality of first cables 300A and the plurality of second cables 300B form at least a part of an electrical loop 400 in which the plurality of apparatuses 100 is electrically connected.

Figure 11:
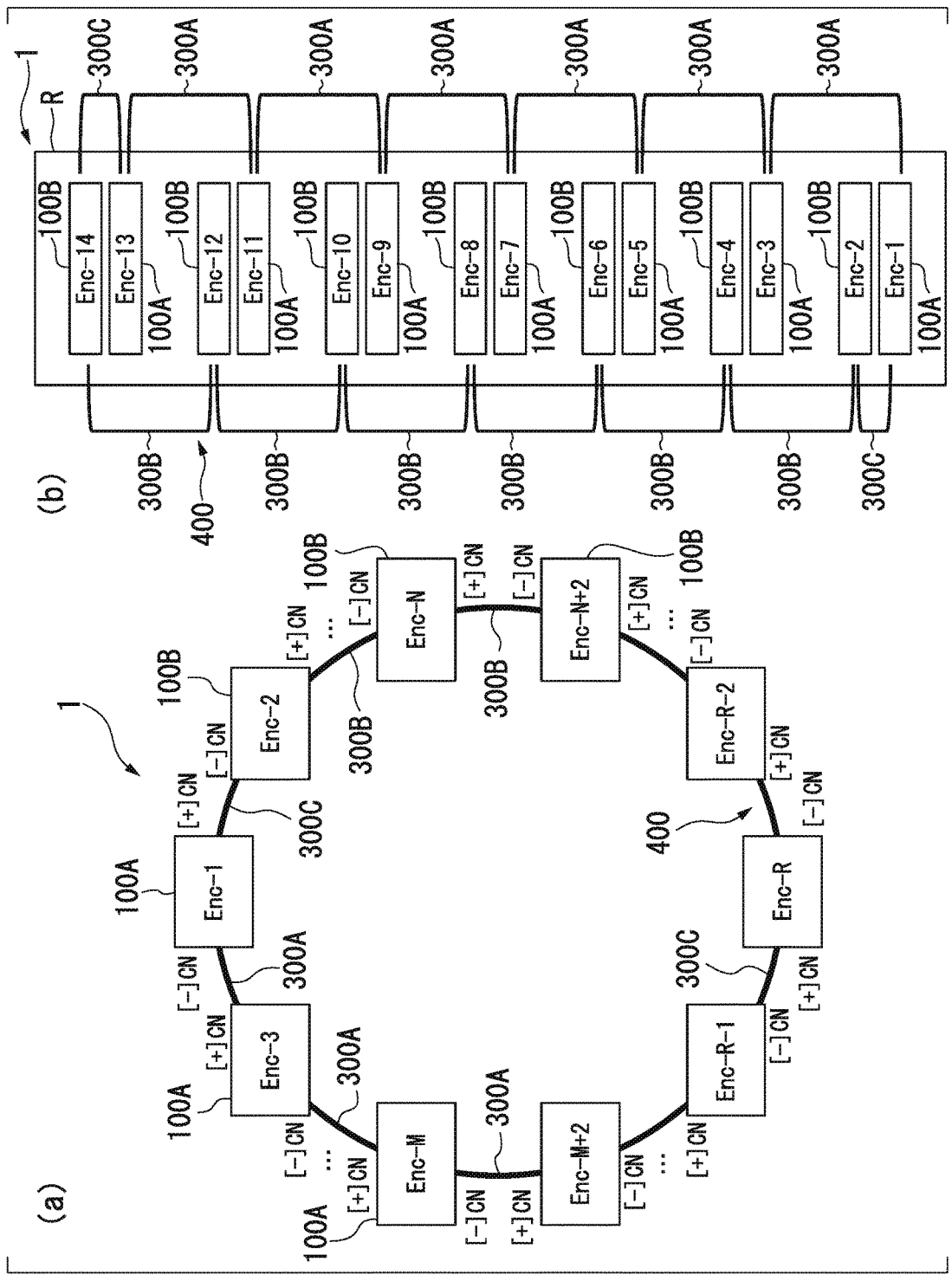

FIG. 11 shows electrical connection relationship between the plurality of apparatuses 100 from a different viewpoint. In FIG. 11, (a) is a schematic representation of the electrical connection relationship among the apparatuses 100, and (b) shows the connection relationship of (a) in FIG. 11 together with physical location of the apparatuses 100 in the rack R.

That is, in the present embodiment, devices numbers starting from 1 are assigned to the plurality of apparatuses 100. R represents the total number of apparatuses 100, N represents an even number, and M represents an odd number. The positive-direction connector 230C of the apparatus 100 (Enc-1) and the negative-direction connection 230D of the apparatus 100 (Enc-2) are connected by a cable 300. The negative-direction connector 230D of the apparatus 100 (Enc-1) and the positive-direction connection 230C of the apparatus 100 (Enc-3) are connected by a cable 300.

The positive-direction connector 230C of the apparatus 100 (Enc-2) is connected by a cable 300 to the negative-direction connector 230D of the apparatus 100 (Enc-4), skipping over the apparatus 100 (Enc-3). The apparatuses 100 to be connected after that have every other device number, that is, are only the even-numbered apparatuses 100 proceeding in the positive direction of the interface unit 130.

On the other hand, the negative-direction connector 230D of the apparatus 100 (Enc-3) is connected by a cable 300 to the positive-direction connector 230C of the apparatus 100 (Enc-5), skipping over the apparatus 100 (Enc-4). The apparatuses 100 to be connected after that have every other device number, that is, are only the odd-numbered apparatuses 100 proceeding in the negative direction of the interface unit 130.

Although the apparatus 100 having the device number R (maximum number of apparatuses) and the apparatus 100 having the device number that is one less (R−1) are not separated by one apparatus, they are connected by a cable 300. That is, the positive-direction connector 230C (or the negative-direction connector 230D) of the apparatus 100 (Enc-R) is connected to the negative-direction connector 230D (or the positive-direction connector 230C) of the apparatus 100 (Enc-R−1) by the cable 300. As a result, the plurality of apparatuses 100 is electrically connected in a loop.

Next, the logical connection relationship between the plurality of apparatuses 100 will be described, with reference to (b) of FIG. 10. As shown in (b) of FIG. 10, in the present embodiment, a plurality of node module cards included in the apparatus 100 (Enc-2) is electrically connected, in the positive Y direction, to a plurality of node module cards included in the storage apparatus 100 (Enc-4). Further, a plurality of node module cards included in the apparatus 100 (Enc-4) is electrically connected, in the positive Y direction, to a plurality of node module cards included in the apparatus 100 (Enc-6). Similarly, a plurality of node module cards included in the apparatus 100 (Enc-3) is electrically connected, in the negative Y direction, to a plurality of node module cards included in the apparatus 100 (Enc-5), and a plurality of node module cards included in the apparatus 100 (ENc-5) is electrically connected, in the negative Y direction, to a plurality of node module cards included in the apparatus 100 (Enc-7). A plurality of node module cards included in the apparatus 100 (Enc-14) is electrically connected, in the positive Y direction, to a plurality of node module cards included in the apparatus 100 (Enc-13). As a result, an electrical loop connection of the plurality node module cards included in the fourteen apparatuses 100.

Next, the method of assigning coordinates (identification addresses, communication addresses) to the plurality of node module cards of the apparatuses 100 will be described. In the present embodiment, the management module 140 of each apparatus 100 automatically assigns coordinates to the node module cards. The management module 140, in accordance with a prescribed program and the device number assigned to each apparatus 100, sets the coordinates of the node module cards included in each apparatus 100. The program to assign the coordinates may be stored beforehand in each of the apparatuses 100, or may be executed via a network. The connection unit 120, in place of the management module 140, may assign the coordinates to the node module cards.

In the present embodiment, the management module 140 in each first apparatus 100A assigns continuous numbers throughout the plurality of first apparatuses 100A (i.e., numbers which are included in continuous numbers throughout the first apparatuses 100A) to the node module cards of the corresponding first apparatus 100A as at least a part of the coordinates of the node module cards of the first apparatus 100A (for example, the coordinate part corresponding to the Y direction). For example, the management module 140 of each first apparatus 100A assigns, as at least a part of the coordinates of the node module cards of the first apparatus 100A, negative integers that are continuous throughout the first apparatuses 100A. That is, the management module 140 of each first apparatus 100A assigns the coordinates of the node module cards of each first apparatus 100A so as to correspond the coordinates to the connection relationship of the node module cards of the first apparatuses 100A. Stated differently, by assigning coordinates throughout the first apparatuses 100A, it is possible to connect, using the cables 300, first apparatuses 100A having non-continuous device numbers.

Similarly, the management module 140 in each second apparatus 100B assigns continuous numbers throughout the plurality of second apparatuses 100B (i.e., numbers which are included in continuous numbers throughout the second apparatuses 100B) to the node module cards of the corresponding second apparatus 100B as at least a part of the coordinates of the node module cards of the second apparatus 100B (for example, the coordinate part corresponding to the Y direction). For example, the management module 140 of each second apparatus 100B assigns, as at least a part of the coordinates of the node module cards of the second apparatus 100B, positive integers that are continuous throughout the second apparatuses 100B. That is, the management module 140 of each second apparatus 100B sets the coordinates of the node module cards of each second apparatus 100B so as to correspond the coordinates to the connection relationship of the node module cards of the second apparatuses 100B. Stated differently, by assigning coordinates, as described above, throughout the plurality of second apparatuses 100B, it is possible to connect, using the cables 300, a plurality of second apparatuses 100B having non-continuous device numbers.

Figure 12:
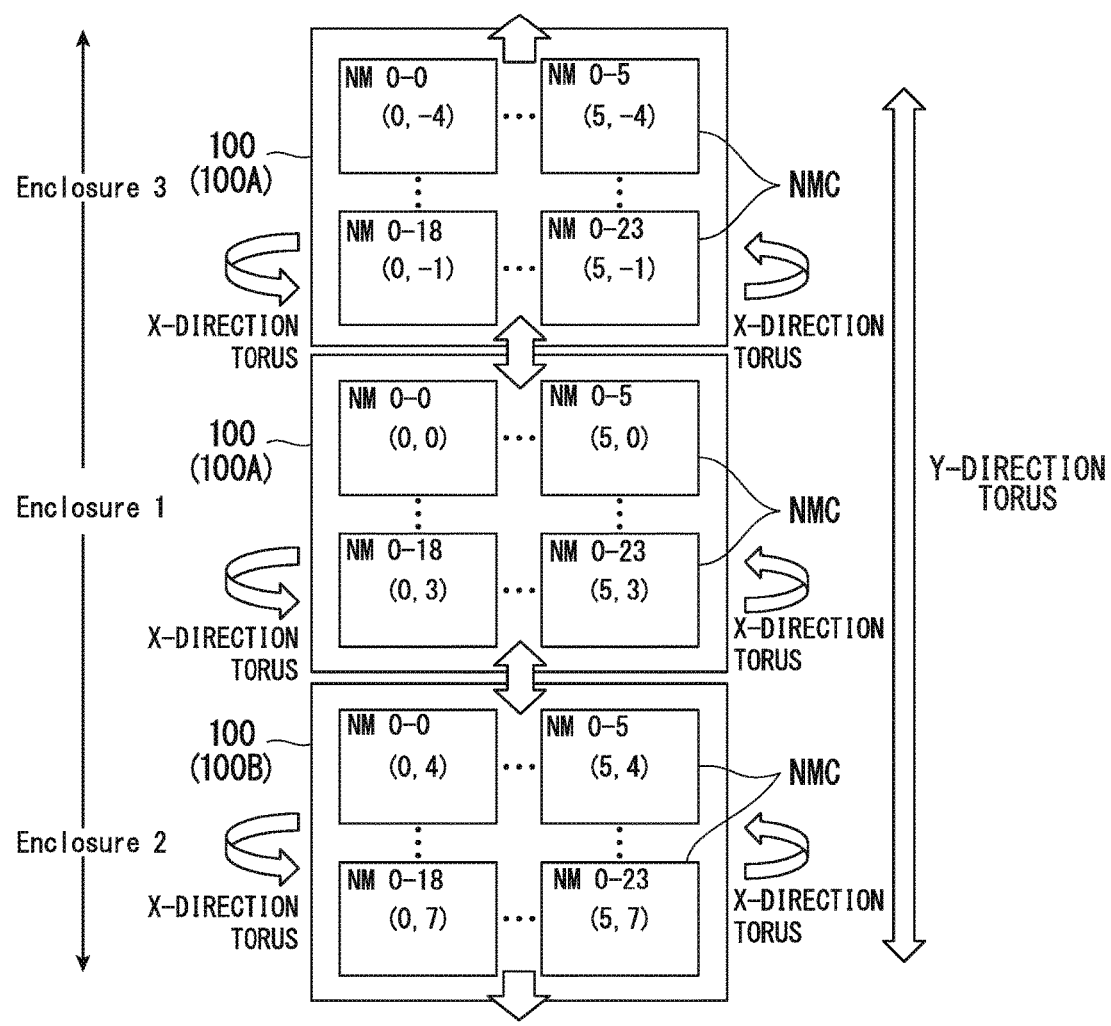
FIG. 12 schematically illustrates connection relationship among the node module cards in the first embodiment.

FIG. 12 shows details of the coordinates assigned to the node module cards of the plurality of apparatuses 100. In FIG. 12, four node module cards disposed at the four corners in the X and Y directions are shown among the 24 node module cards of each apparatus 100 shown in FIG. 8.

As shown in FIG. 12 the node module cards of the apparatus 100 (Enc-1) and the node module cards of the apparatus 100 (Enc-2) have Y-direction coordinates that are mutually continuous (for example, Y-direction coordinates that are continuous in the positive direction). In the same manner, the node module cards of the apparatus 100 (Enc-1) and the node module cards of the apparatus 100 (Enc-3) have Y-direction coordinates that are mutually continuous (for example, Y-direction coordinates that are continuous in the negative direction).

The node module cards of each first apparatus 100A communicate based on these coordinates assigned by the management module 140 of each first apparatus 100A. For example, the routing circuit 111 of the node module cards of each first apparatus 100A transfers data based on the coordinates assigned by the management modules 140.

Similarly, the node module cards of each second apparatus 100B communicate based on these coordinates assigned by the management module 140 of each second apparatus 100B. For example, the routing circuit 111 of the node module cards of each second apparatus 100B transfers data based on the coordinates assigned by the management modules 140.

Next, addition of the apparatus 100 according to the present embodiment will be described. For example, if the apparatuses 100 are arranged successively from the bottom end of the rack R, the apparatus 100 having the maximum device number R is at the very top. If the number of the apparatuses 100 is to be increased, an apparatus 100 having the device number R+1 is placed above the apparatus 100 having the device number R. The apparatus 100 having the device number R−1 and the apparatus 100 having the device number R+1 are then connected by a cable 300. The apparatus 100 having the device number R and the apparatus 100 having the device number R+1 are connected by a cable 300. In addition, the electrical connection between the apparatus 100 having the device number R and the apparatus 100 having the device number R−1 by the cable 300 is disconnected.

Described in greater detail, if an expansion is to be made to R apparatuses (where the device number R is an even number) of the system, the device number of the apparatus 100 to be added will be R+1. In this case, the node module cards having numbers from 0-18 to 0-23 of the apparatus 100 having the device number R+1 and the node module cards having numbers from 0-0 to 0-5 of the apparatus 100 having the device number R−1 are connected. The node module cards having numbers from 0-18 to 0-23 of the apparatus 100 having the device number R and the node module cards having numbers from 0-0 to 0-5 of the apparatus 100 having the device number R+1 are connected. As a result, a torus is formed in the Y direction.

If the expansion is to be made to P apparatuses (where the device number P is an odd number) of the system, the device number of the apparatus 100 to be added will be P+1. In this case, the node module cards having numbers from 0-0 to 0-5 of the apparatus 100 having the device number P+1 and the node module cards having numbers from 0-18 to 0-23 of the apparatus 100 having the device number P−1 are connected. The node module cards having numbers from 0-0 to 0-5 of the apparatus 100 having the device number P and the node module cards having numbers from 0-18 to 0-23 of the apparatus 100 having the device number P+1 are connected. As a result, a torus is formed in the Y direction.

According to the above configuration, it is possible to relatively simply configure a large-scale system. That is, in the present embodiment, the storage system 1 has a plurality of apparatuses 100 and a plurality of cables 300. Each of the apparatuses 100 has a plurality of circuit elements (for example, node module cards) mutually electrically connected in a loop within each of the apparatuses 100. A plurality of cables 300 electrically connects the plurality of apparatuses 100 in a loop. This connects a plurality of circuit elements included in the apparatuses 100 and enables easy configuration of a large-scale system.

In the present embodiment, at least one cable 300 electrically connects two non-neighboring apparatuses 100 and forms at least a part of the electrical loop connection path 400 (i.e., electrical loop connection part). This configuration enables the relatively easy electrical connection of the apparatuses 100 in a loop.

Here, the cable to connect between the apparatuses 100 may be an electrical cable that communicates electrical signals as is and an optical cable that communicates optical signals converted from electrical signals by an optical module. Although an optical cable is suitable for long-distance communication, its high cost and ease of breakage make it difficult to use. Further, as in the present embodiment, when many circuit elements (for examples, node module cards) are electrically connected in a line, disposition of the optical modules may be difficult because of the large number of signal lines. On the other hand, the electrical cable does not require the high-cost optical modules and thus is less expensive. However, the electrical cable is has a larger signal attenuation than the optical cable. For example, when the electrical cable is used, the possible cable length may be limited to approximately several meters because of the attenuation. For this reason, the location of apparatuses 100 in the rack R may be restricted to a range within the cable length. For this reason, when the electrical cable is used, the scale of the installable system may be restricted by the requirement of the cable length.

Also, there are information processing systems that can scale-up (scale-out) to enhance and expand processing capability and data storage capacity. Such systems generally start with a small number of apparatuses and increases the number in accordance with utilization conditions. For this reason, it is desirable in such systems that can scale-up that apparatus expansion be easy.

Given this, in the present embodiment, the storage system 1 has a plurality of mutually arranged apparatuses 100 and a plurality of cables 300. The cables 300 electrically connect two mutually non-neighboring apparatuses 100 in the apparatuses 100, and form at least a part of an electrical loop connection path 400 (i.e., electrical loop connection part) that connects the apparatuses 100. Compared to a second embodiment described below, this configuration enables to shorten the maximum length (maximum interconnection length) of the cables 300. For this reason, it is possible to provide a storage system 1 that can be expanded without restriction of the cable length.

In the present embodiment, the storage system 1 includes a plurality of apparatuses 100 and a plurality of cables 300. The apparatuses 100 include a plurality of first apparatuses 100A and a plurality of second apparatuses 100B, which are arranged alternately. Each of the apparatuses 100 has a plurality of memory modules (for example, node module cards), and a first-type terminal (for example, the positive-direction connector 230C) and a second-type terminal (for example, the negative-direction connector 230D) that are electrically connected to the plurality of memory modules. By mutually electrically connecting the apparatuses 100 via the first-type terminals and the second-type terminals, a packet that includes data to be stored in at least one of a plurality of memory modules can be transferred through the apparatuses 100. The cables 300 include a plurality of first cables 300A and a plurality of second cables 300B. In the first apparatuses 100A, the first cables 300A connect the first-type terminal of one first apparatus 100A to the second-type terminal of another first apparatus 100A, so that the first apparatuses 100A are electrically connected in series, so as to enable successive transfer of the packet through the first apparatuses 100A. In the second apparatuses 100B, the second cables 300B connect the first-type terminal of one second apparatus 100B to the second-type terminal of another second apparatus 100B, so that the second apparatuses 100B are electrically connect in series, so as to enable successive transfer of the packet through the second apparatuses 100B. The first cables 300A and the second cables 300B form at least a part of the electrical loop connection path 400.

According to such connection, a plurality of apparatuses 100 can be arranged successively in the order of the device number from one end of the rack R (for example, the bottom end or the top end). According to such arrangement, it is easy to locate positions of the apparatuses 100 in the rack R, and perform installation of the apparatuses 100. According to the above configuration, the apparatuses 100 are sequentially arranged from one end of the rack R without openings therebetween, and the expansion direction does not change when expansion of the apparatuses 100 is done. In the following third and fourth embodiments, because the expansion direction of the apparatuses 100 changes midway, it is necessary to provide a space that anticipates expansion within the rack R. When a system is first configured, unless the number of expansion apparatuses is estimated accurately, space provided can be either wasted or insufficient. In contrast, according to the configuration of the present embodiment, because apparatuses 100 can be installed from one end of the rack R with no openings therebetween, it is possible to efficiently use the space within the rack R.

Additionally, according to above configuration, even if a plurality of apparatuses 100 is arranged in the order of the device number, it is possible to electrically connect these apparatuses 100 in a loop, using relative short cables 300. For this reason, according to the above configuration, compared to the following second and third embodiments, it is possible to make the maximum length (maximum interconnection length) of the cables 300 shorter. For example, the maximum length of the cables 300 can be approximately the length that skips (straddles) one apparatus 100. For this reason, it is possible to provide a storage system 1 that can be expanded without restriction by the requirement of the cable length. When the storage system 1 is expanded, it is not necessary to remove an existing apparatus 100 from the rack R, thereby enabling expansion of the storage system 1 while the system operates. That is, according to the above configuration, it is possible to provide a storage system 1 having a shorter cables and expandable without restriction by the requirement of the cable length.

In the present embodiment, the plurality of cables 300 includes a third cable 300C that connect a first apparatus 100A positioned at one end of the plurality of first apparatuses 100A in the arrangement direction thereof and a second apparatus 100B positioned at the same end of the plurality of second apparatuses 100B in the arrangement direction thereof.

According to such a configuration, it is possible to connect the first apparatuses 100A connected by the first cables 300A and the second apparatuses 100B connected by the second cables 300B. This enables, with a relatively simple configuration, the electrical connection of the first apparatuses 100A and the second apparatuses 100B in a loop.

In the present embodiment, each apparatus 100 is configured to assign arbitrary coordinates (identification address, communication address) to each node module cards. According to this configuration, the plurality of apparatuses 100 that has non-consecutive device numbers can be connected using the cables 300.

For example, each of the plurality of first apparatuses 100A includes a first circuit (for example, a management module 140 of the first apparatus 100A) that is configured to assign continuous numbers throughout the plurality of first apparatuses 100A to a plurality of memory modules of the corresponding first apparatus 100A as a part of the coordinates. That is, each of the first apparatuses 100A includes a first circuits, and each of the first circuits is configured to assign numbers to the pluralities of memory modules of the corresponding first apparatus 100A as part of the communication addressees of the pluralities of memory modules of the first apparatuses 100A, the numbers being serial numbers over the first apparatuses 100A. Each of the second apparatuses 100B includes a second circuit (for example, a management module 140 of the second apparatus 100B) that is configured to assign continuous numbers throughout the second apparatuses 100B to a plurality of memory modules of the corresponding second apparatus 100B as a part of the coordinates. That is, each of the second apparatuses 100B includes a second circuit, and each of the second circuits is configured to assign numbers to the pluralities of memory modules of the corresponding second apparatus 100B as part of the communication addressees of the pluralities of memory modules of the second apparatuses 100B, the numbers being serial numbers over the second apparatuses 100B. The plurality of memory modules of each of the first apparatuses 100A and the second apparatuses 100B transfer the packet based on the coordinates assigned by the first circuits or the second circuits.

According to such a configuration, when a plurality of apparatuses 100 is connected, skipping over every other of the apparatuses 100, by cables 300, it is possible to assign coordinates corresponding to the connection sequence of the cables 300 to the memory modules of each apparatus 100. Stated differently, by setting communication addresses in this manner, it is possible to connect apparatuses 100 that are non-neighboring in a plurality of apparatuses 100 using the cables 300.

In the present embodiment, the first circuits assign continuous negative integers to memory modules throughout the first apparatuses 100A as part of the coordinates. The second circuit assigns continuous positive integers to memory modules throughout the second apparatuses 100B as part of the coordinates.

According to such a configuration, it is easy to assign continuous coordinates throughout the first apparatuses 100A and the second apparatuses 100B.

In the present embodiment, the management module 140 of an apparatus 100 automatically sets the coordinates of the node module cards. According to such a configuration, it is possible to reduce the burden required to expand the system 1.

In the present embodiment, each of the plurality of apparatuses 100 has an enclosure 200 to be placed in the rack R and a plurality of boards set in the enclosure 200. The boards include a plurality of memory modules. According to such a configuration, by arranging the apparatuses 100 in the rack R and establishing electrical connection of the apparatuses 100 in a loop, it is possible to provide a storage system 1 that can be easily expanded.

(Second Embodiment)

Next, referring to FIG. 13, a storage system 1 according to a second embodiment will be described. The present embodiment is different from the first embodiment with regard to the method of arranging the apparatuses 100. Elements of storage system 1 in the present embodiment are substantially the same as those in the first embodiment, and description thereof will be omitted.

Figure 13:
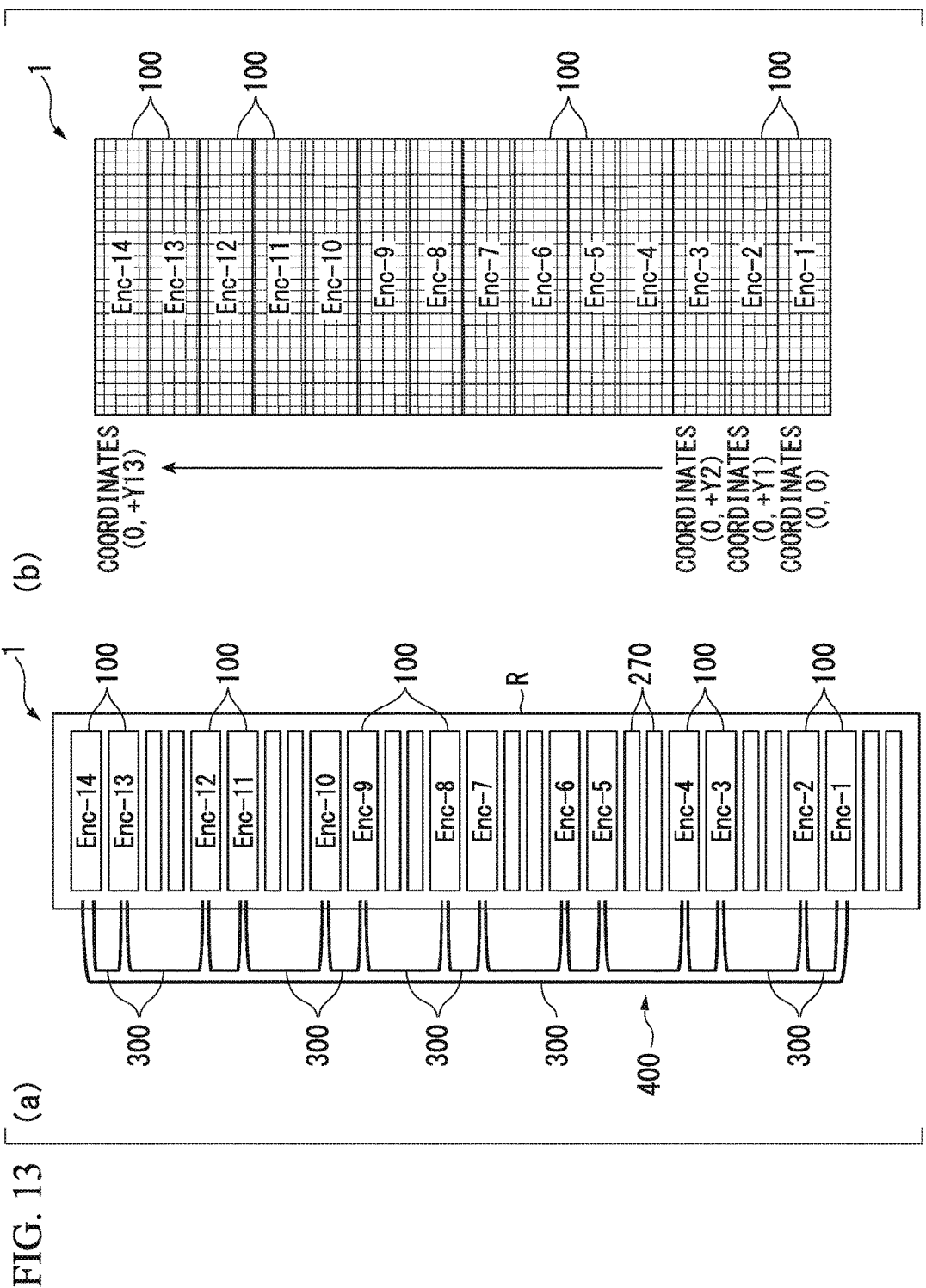
FIG. 13 schematically illustrates physical and electrical connection relationship among a plurality of storage apparatuses in a second embodiment.

FIG. 13 shows the connection relationship of the plurality of apparatuses 100. In FIG. 13, (a) shows physical location of the apparatuses 100 in the rack R and (b) shows the logical connection relationship (electrical connection relationship) of the apparatuses 100.

As shown in (a) of FIG. 13, the plurality of apparatuses 100, similar to the first embodiment, the positive-direction connector 230C of one apparatus 100 and the negative-direction connector 230D of another apparatus 100 are connected by a cable 300 so as to electrically connect the two apparatuses 100. In the present embodiment, the positive-direction connector 230C of the apparatus 100 (Enc-1) positioned at one end (for example, the bottom end) of the rack R and the negative-direction connector 230D of the apparatus 100 (Enc-2) positioned next thereto are connected by a cable 300. In the same manner, the positive-direction connector 230C of the apparatus 100 (Enc-2) and the negative-direction connector 230D of the apparatus 100 (Enc-3) positioned next thereto are connected by a cable 300. That is, in the present embodiment, two mutually neighboring apparatuses 100 are connected by a cable 300. By repeating this type of connection, a plurality of apparatuses 100 arranged along the prescribed direction is electrically connected in a line. This enables a packet to be successively transferred in the apparatuses 100.

Further, the positive-direction connector 230C of the apparatus 100 positioned uppermost (i.e., the apparatus 100 (Enc-14)) and the negative-direction connector 230D of the apparatus 100 positioned lowermost (i.e., the apparatus 100 (Enc-1)) are connected by a relatively long cable 300. This electrically connects a plurality of apparatuses 100 in a loop.

In the present embodiment, the connection is made from the apparatus 100 (Enc-1) in the positive direction. Alternatively, connection may be made from the apparatus 100 (Enc-1) in the negative direction. In this case, the "positive-direction connector" and "negative-direction connector" in the above are reversed.

Next, referring to (b) of FIG. 13, the logical connection relationship of the plurality of apparatuses 100 will be described. As shown in (b) of FIG. 13, a plurality of node module cards included in the apparatus 100 (Enc-1) is electrically connected in the positive Y direction to a plurality of node module cards included in the apparatus 100 (Enc-2), a plurality of node module cards included in the apparatus 100 (Enc-2) is electrically connected in the positive Y direction to a plurality of node module cards included in the apparatus 100 (Enc-3), and a plurality of node module cards included in the apparatus 100 (Enc-14) is electrically connected in the positive Y direction to a plurality of node module cards included in the apparatus 100 (Enc-1). This electrically connects a plurality of node module cards included in the fourteen apparatuses 100 in a loop.

Next, the method of assigning coordinates (identification addresses, communication addresses) to the plurality of node module cards in each apparatus 100 will be described. In the present embodiment, the management modules 140 assign continuous numbers (i.e., serial numbers) to pluralities of node module cards included in the apparatuses 100, in the order of the device number. That is, coordinates assigned to the node module cards included in the apparatus 100 (Enc-2) are consecutive to the coordinates assigned to the node module cards included in the apparatus 100 (Enc-1). Further, coordinates assigned to the node module cards included in the apparatus 100 (Enc-3) are consecutive to the coordinates assigned to the node module cards included in the apparatus 100 (Enc-2).

According to such a configuration, similarly to the first embodiment, it is relatively easy to configure a large-scale system.

In the present embodiment, the plurality of apparatuses 100 is arranged from one end of the rack R in the order of the device number, with no openings therebetween. According to such a configuration, it is easy to recognize the positions of the apparatuses 100 and perform installation of the apparatuses 100. If a plurality of apparatuses 100 is arranged from one end of the rack R with no openings therebetween, it is easy to plan expansion of the storage system 1. For example, if the storage system 1 of the present embodiment is to be expanded, it is sufficient to add one or more apparatuses 100 above the apparatus 100 (Enc-14). That is, when the storage system 1 is expanded, it is not necessary to remove an existing apparatus 100 from the rack R, and thus it is possible to expand the storage system 1 while the system operates. For this reason, it is possible to provide a storage system 1 that is easy to expand.

In the present embodiment, a cable 300 electrically connects non-neighboring two apparatuses 100, forming at least a part of an electrical loop connection path 400 that electrically connects the apparatuses 100. According to such a configuration, it is possible to electrically connect the apparatuses 100 arranged in the order of the device number in a loop.

(Third Embodiment)

Next, referring to FIG. 14, a storage system 1 of a third embodiment will be described. The present embodiment is different from the first embodiment with regard to the method of arranging the apparatuses 100. Elements of storage system 1 in the present embodiment are substantially the same as those in the first embodiment, and description thereof will be omitted.

Figure 14:
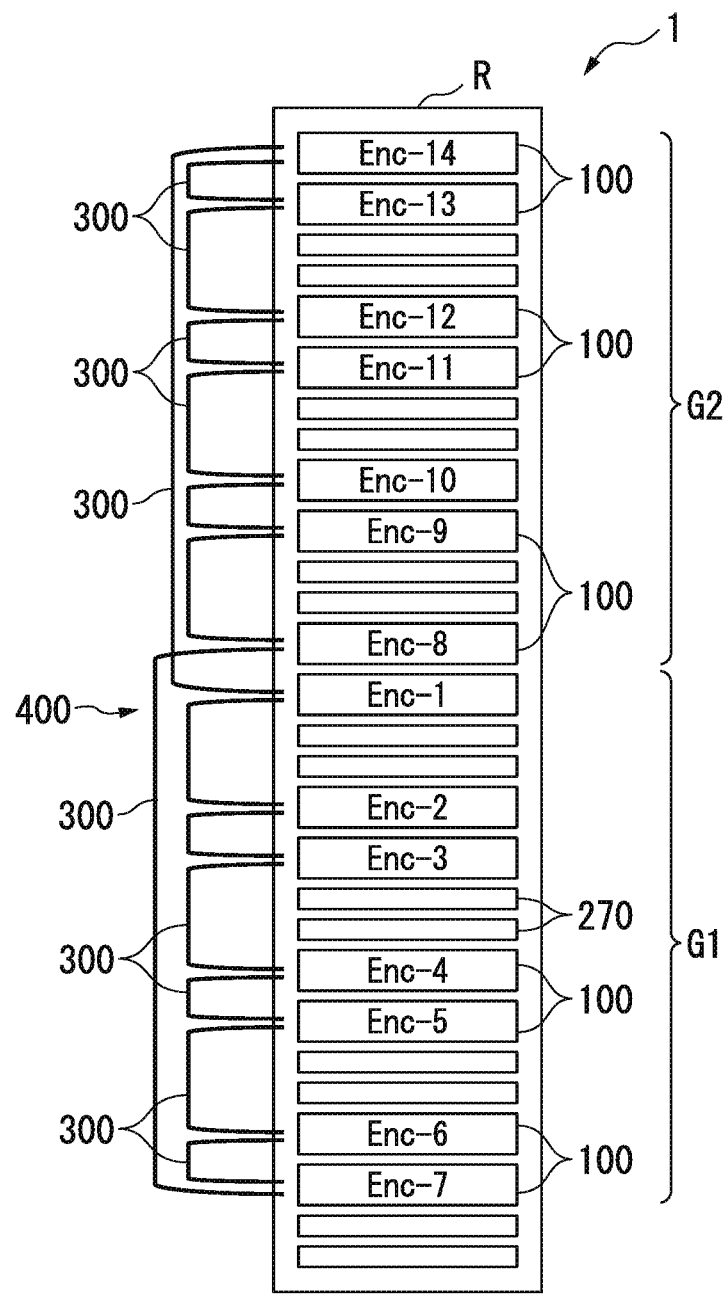
FIG. 14 schematically illustrates physical and electrical connection relationship among a plurality of storage apparatuses in a third embodiment.

As shown in FIG. 14, in the present embodiment, the apparatuses 100 is arranged in a prescribed direction. The apparatuses 100 include a plurality of apparatuses 100 included in a first group G1 and a plurality of apparatuses 100 included in a second group G2. The apparatuses 100 in the first group G1 are located in lower half of the rack R, and those in the second group G2 are located in the upper half of the rack R.

As shown in FIG. 14, the arrangement order of the apparatuses 100 in the first group G1 is different from that of the apparatuses 100 in the second group G2. For example, the apparatuses 100 in the first group G1 are arranged, such that the apparatus 100 with the smallest device number is located at the center of the rack R, and that the other apparatuses 100 are arranged downward in the order of the device number. In contrast, the apparatuses 100 in the second group G2 are arranged, such that the apparatus 100 with the smallest device number is disposed at the center of the rack R, and that, the other apparatuses 100 are arranged upward in the order of the device number.

The positive-direction connector 230C (or negative-direction connector 230D) of the apparatus 100 in the first group G1 that is positioned at the end of the rack R (i.e., the apparatus 100 (Enc-7)) and the negative-direction connector 230D (or positive-direction connector 230C) of the apparatus 100 having the smallest device number of the second group G2 (i.e., the apparatus 100 (Enc-8)) are connected by a cable 300.

Additionally, the positive-direction connector 230C (or negative-direction connector 230D) of the apparatus 100 in the second group G2 that is positioned at the end of the rack R (i.e., the apparatus 100 (ENc-14)) and the negative-direction connector 230D (or positive-direction connector 230C) of the apparatus 100 having the smallest device number of the first group G1 (i.e., the apparatus 100 (Enc-1)) are connected by a cable 300. As a result, the apparatuses 100 are electrically connected in a loop.

In the present embodiment, the method of assigning coordinates to the node module cards of each of the apparatuses 100 is the same as that in the second embodiment. That is, the management modules 140 assign continuous numbers (i.e., serial numbers) to pluralities of node module cards included in the apparatuses 100, in the order of the device number.

According to such a configuration, similar to the first embodiment, it is relatively easy to configure a large-scale system.

In the present embodiment, each of the cables 300 electrically connects two non-neighboring apparatuses 100, forming at least a part of an electrical loop connection path 400 connecting the plurality of apparatuses 100. According to such a configuration, compared with the second embodiment, the maximum length of the cables 300 can be shorter. For this reason, it is possible to provide a storage system 1 that can be expanded with less restriction by the requirement of the cable length.

In the present embodiment, if the overall number of apparatuses 100 is below a certain number (for example, 7 or less), the installation sequence and device numbers can be easily recognized, and expansion of the storage system 1 can be simply and easily performed.

(Fourth Embodiment)

Next, referring to FIG. 15, the storage system 1 according to a fourth embodiment will be described. The present embodiment is different from the first embodiment with regard to the method of arranging the apparatuses 100. Elements of the storage system 1 in the present embodiment are substantially the same as those in the first embodiment, and description thereof will be omitted.

Figure 15:
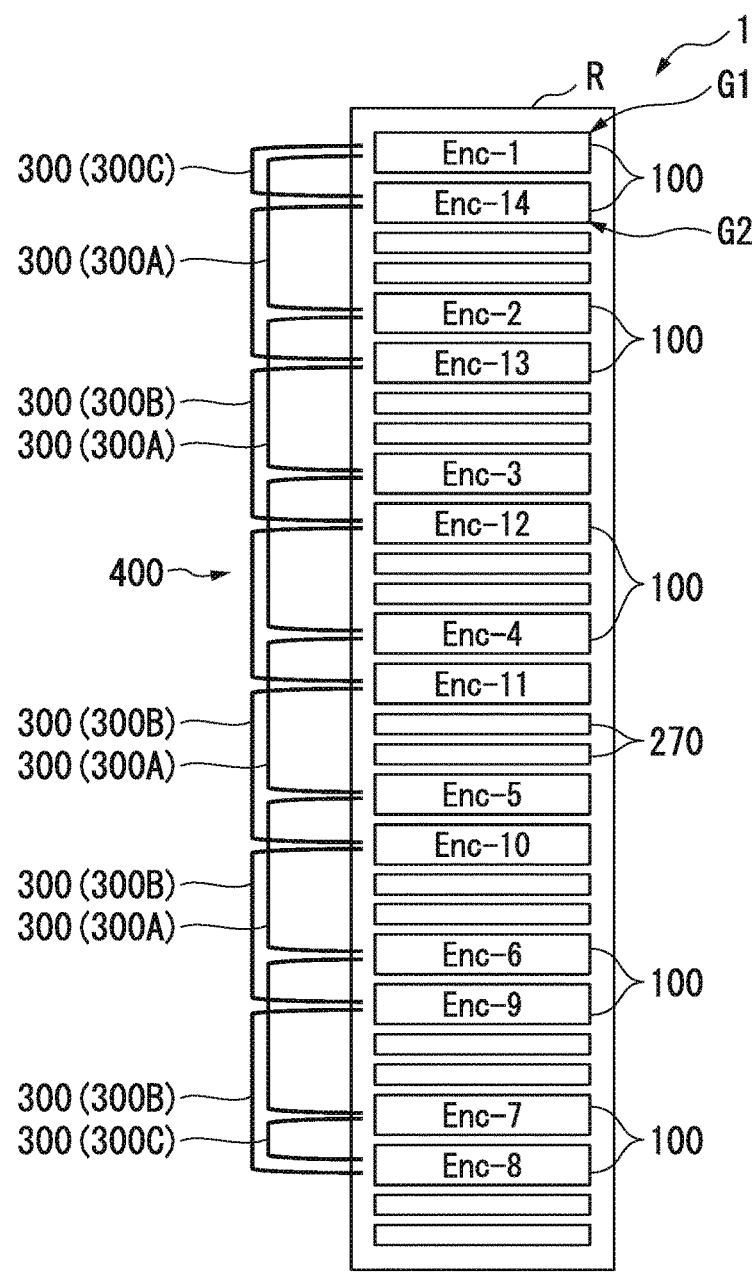
FIG. 15 schematically illustrates physical and electrical connection relationship among a plurality of storage apparatuses in a fourth embodiment.

As shown in FIG. 15, in the present embodiment, the plurality of apparatuses 100 is arranged in a prescribed direction. The apparatuses 100 include a plurality of apparatuses 100 included in the first group G1 and a plurality of apparatuses 100 included in the second group G2. The apparatuses 100 in the first group G1 is the half of the entire apparatuses 100, which have small device numbers (i.e., the apparatuses 100 with device numbers from 1 to 7), and the apparatuses 100 in the second group G2 is the other half of the apparatuses 100, which have large device numbers (i.e., the apparatuses 100 with device numbers from 8 to 14).

As shown in FIG. 15, the sequence of arranging the apparatuses 100 of the first group G1 and the sequence of arranging the apparatuses 100 of the second group G2 are different. For example, the apparatuses 100 of the first group G1 are arranged in a first direction (for example from the top end toward the bottom end of the rack R) in the incremental order of the device number. In contrast, the apparatuses 100 of the second group G2 are arranged in a second direction opposite to the first direction (for example from the bottom end toward the top end of the rack R) in the decremental order of the device number. As shown in FIG. 15, the apparatuses 100 of the first group G1 and the apparatuses 100 of the second group G2 are arranged alternately.

The plurality of cables 300 include a plurality of first cables 300A that connect apparatuses 100 of the first group G1 and a plurality of second cables 300B that connect apparatuses 100 of the second group G2.

Each of the first cables 300A, in the apparatuses 100 included in the first group G1, connects the positive-direction connector 230C of one apparatus 100 with the negative-direction connector 230D of another 100. That is, the first cables 300A connect only between the apparatuses 100 in the first group G1, and not between the apparatuses 100 in the second group G2. As a result, the apparatuses 100 in the first group G1 are electrically connected in series. Stated differently, the first cables 300A make connections, skipping over every other apparatus 100 arranged in the first direction.

In the same manner, each of the plurality of second cables 300B, in the plurality of apparatuses 100 included in the second group G2, connects the positive-direction connector 230C of one apparatus 100 with the negative-direction connector 230D of another 100. That is, the second cables 300B connect only between the apparatuses 100 in the second group G2, not between the apparatuses 100 in the first group G1. As a result, the apparatuses 100 in the second group G2 are electrically connected in series. Stated differently, the second cables 300B make connections, skipping over every other apparatus 100 of the apparatuses 100 arranged in the first direction.

The cables 300 include two third cables 300C provided at the ends of the rack R. A third cables 300C, for example at the top end of the rack R, connects one apparatus 100 in the first group G1 (i.e., the apparatus 100 (Enc-1)) and one apparatus 100 in the second group G2 (i.e., the apparatus 100 (Enc-14)). The other third cable 300C, at the bottom end of the rack R, connects one apparatus 100 in the first group G1 (i.e., the apparatus 100 (Enc-7)) and one apparatus 100 in the second group G2 (i.e., apparatus 100 (Enc-8)). As a result, the plurality of apparatuses 100 is electrically connected in a loop.

In the present embodiment, the method of assigning coordinates to the node module cards of each apparatus 100 is the same as that in the second embodiment. That is, the management modules 140 assign continuous numbers (i.e., serial numbers) to pluralities of node module cards included in the plurality of apparatuses 100, in the order of the device number.

According to such a configuration, similar to the first embodiment, it is relatively easy to configure a large-scale system. Further, compared to the second and embodiments, it is possible to make the maximum length of the cables 300 shorter. For example, the maximum length of the cables 300 can be made approximately a length that is sufficient to skip one apparatus 100. For this reason, it is possible to provide a storage system 1 that can be expanded with less restriction by the requirement of the cable length.

(Fifth Embodiment)

Next, referring to FIG. 16, the storage system 1 according to a fifth embodiment will be described. The present embodiment is different from the first embodiment with regard to the disposition of the apparatuses 100. Elements of the storage system 1 in the present embodiment are substantially the same as those in the first embodiment, and description thereof will be omitted.

Figure 16:
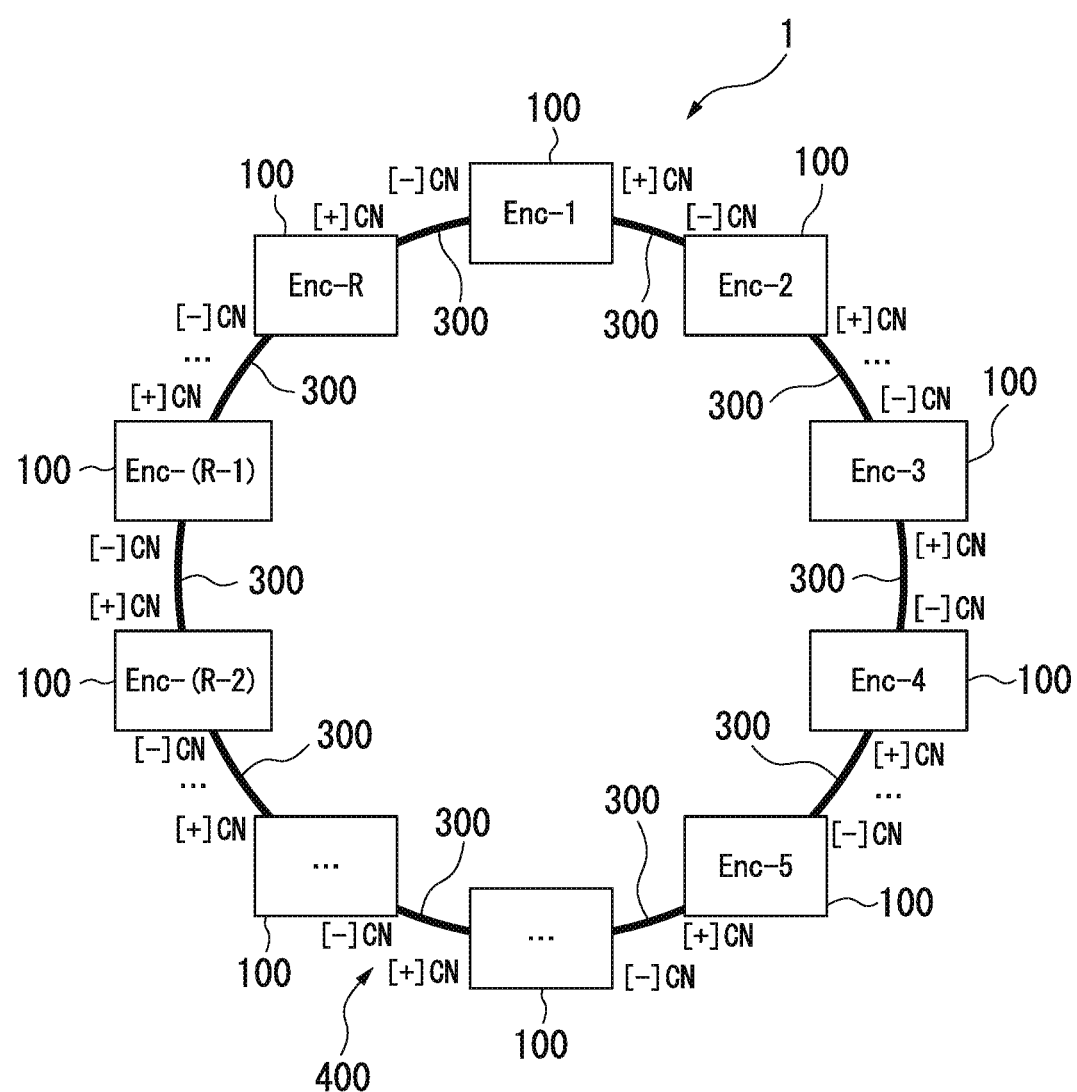
FIG. 16 schematically illustrates physical and electrical connection relationship among a plurality of storage apparatuses in a fifth embodiment.

As shown in FIG. 16, in the present embodiment, the plurality of apparatuses 100 is physically arranged in a loop (that is, in sequence in some given direction), in the order of the device number. Each of the plurality of cables 300 connects two mutually neighboring apparatuses 100 of the apparatuses 100. That is, each of the cables 300, in two apparatuses 100 that are mutually neighboring, connects the positive-direction connector 230C of one apparatus 100 and the negative-direction connector 230D of the other apparatus 100.

With this configuration as well, the plurality of apparatuses 100 is electrically connected in a loop. This enables relatively easy configuration of a large-scale system.

Although the foregoing is description of storage systems 1 according to the first to fifth embodiments, embodiments are not restricted to those described above. For example, the plurality of cables 300 may form the entirety of the electrical connection path 400 that electrically connects the apparatuses 100 in a loop, or may form only a part thereof. If the cables 300 form only a part of the electrical connection path 400, the remaining part may be formed by another electrical connection member. The plurality of apparatuses 100 communicates, for example, data and control information, via the cables 300. Alternatively, the apparatuses 100 may supply power via a cable 300.

In above embodiments, a plurality of circuits (e.g., a plurality of management modules) assigns continuous numbers (i.e., serial numbers) to pluralities of memory modules as at least in part the coordinates. Instead, a circuit (e.g., a management module) or an external device may assign the continuous numbers (i.e., serial numbers) to the pluralities of memory modules.

According to at least one of the above-described embodiments, a cable electrically connects two non-neighboring apparatuses and forms at least a part of the electrical loop connection path connecting the plurality of apparatuses. This enables relatively easy electrical connection of the plurality of apparatuses in a loop.

While certain embodiments have been described, these embodiments have been presented by way of example only, and are not intended to limit the scope of the inventions. Indeed, the novel embodiments described herein may be embodied in a variety of other forms, and various omissions, substitutions and changes in the form of the embodiments described herein may be made without departing from the spirit of the inventions. The accompanying claims and these equivalents are intended to cover such forms or modifications as would fall within the scope and spirit of the invention.

What is claimed is:

1. A data storage system, comprising:
   a holder;
   a plurality of storage devices including a plurality of first storage devices and a plurality of second storage devices arranged along a line in the holder, each of the plurality of the storage devices including first and second connection interfaces;
   a plurality of first cables that electrically connects the first storage devices;
   a plurality of second cables that electrically connects the second storage devices;
   a third cable that electrically connects a third storage device and a fourth storage device, the third storage device being one of the first storage devices, the fourth storage device being one of the second storage devices; and
   a fourth cable that electrically connects a fifth storage device and a sixth storage device, the fifth storage device being one of the first storage devices and different from the third storage device, the sixth storage device being one of the second storage devices and different from the fourth storage device,
   wherein
   each of the first connection interfaces is directly connected to a second connection interface of another storage device through one of the first, second, third, and fourth cables and each of the second connection interfaces is directly connected to a first connection interface of another storage device through one of the first, second, third, and fourth cables, such that an electrical loop connection is formed through the plurality of first cables, the plurality of second cables, the third cable, and the fourth cable, and
   the first and the second storage devices are disposed alternately along the line in the holder.

2. The data storage system according to claim 1, wherein connection interfaces of two storage devices at opposite ends along the line are not directly connected.

3. The data storage system according to claim 1, wherein connection interfaces of two adjacent storage devices that are at a first end along the line are directly connected.

4. The data storage system according to claim 3, wherein connection interfaces of two adjacent storage devices that are at a second end along the line are directly connected.

5. The data storage system according to claim 1, wherein connection interfaces of two storage devices that are separated by one and no more than one storage device are directly connected.

6. The data storage system according to claim 1, wherein each of the storage devices includes a plurality of memory modules arranged in a matrix form in first and second directions, and
the first connection interface is directly connected to memory modules arranged at a first end in the first direction and the second connection interface is directly connected to memory modules arranges at a second end in the first direction.

7. The data storage system according to claim 6, wherein an electrical loop connection is formed through each group of memory modules arranged in the first direction.

8. The data storage system according to claim 6, wherein an electrical loop connection is formed through each group of memory modules arranged in the second direction.

9. The data storage system according to claim 6, wherein each of the storage devices further includes a controller configured to assign, to each of the memory modules within the storage device, consecutive coordinate values in the first and second directions.

10. The data storage system according to claim 9, wherein the controllers assigns, to the memory modules of the plurality of storage devices that are arranged in the first direction through the first and second connection interfaces, consecutive coordinate values in the first direction.

11. The data storage system according to claim 1, wherein in each of the storage devices, a connection terminal of the first connection interface and a connection terminal of the second connection interface are located on a same side thereof, and
in the holder, the connection terminals of the first and second connection interfaces of the plurality of storage devices are arranged on a same side of the holder.

12. A method for assembling a data storage system with a plurality of storage devices, the method comprising:
   arranging a plurality of storage devices including a plurality of first storage devices electrically connected together through first cables and a plurality of second storage devices electrically connected together through second cables, along a line in a holder, each of the storage devices including first and second connection interfaces, a third storage device of the first storage devices and a fourth storage device of the second storage devices being electrically connected via a third cable, a fifth storage device of the first storage devices that is different from the third device and a sixth storage device of the second storage devices that is different from the fourth device being electrically connected via a fourth cable; and directly connecting each of the first connection interfaces to a second connection interface of another storage device through one of the first, second, third and fourth cables, and each of the second connection interfaces to a first connection interface of another storage device through one of the first, second, third, and fourth cables, such that an electrical loop connection is formed through the plurality of first cables, the plurality of second cables, the third cable, and the fourth cable, wherein the first and the second storage devices are disposed alternately along the line.

13. The method according to claim 12, wherein connection interfaces of the storage devices that are arranged at opposite ends along the line are not directly connected.

14. The method according to claim 12, wherein connection interfaces of two adjacent storage devices that are at a first end along the line are directly connected.

15. The method according to claim 14, wherein connection interfaces of two adjacent storage devices that are at a second end along the line are directly connected.

16. The method according to claim 12, wherein connection interfaces of two storage devices that are separated by one and no more than one storage device are directly connected.

17. The method according to claim 12, wherein each of the storage devices includes a plurality of memory modules arranged in a matrix form in first and second directions, and the first connection interface is directly connected to memory modules arranged at a first end in the first direction and the second connection interface is directly connected to memory modules arranges at a second end in the first direction.

18. The method according to claim 17, wherein an electrical loop connection is formed through each group of memory modules arranged in the first direction.

19. The method according to claim 17, wherein in each of the storage devices, a connection terminal of the first connection interface and a connection terminal of the second connection interface are located on a same side thereof, and in the holder, the connection terminals of the first and second connection interfaces of the plurality of storage devices are arranged on a same side of the holder.

20. A data storage system, comprising:

a holder;

a plurality of storage devices including a first storage device, a plurality of second storage devices, a plurality of third storage devices, and a fourth storage device, each of the storage devices having first and second connection interfaces, wherein the storage devices are arranged along a line in the holder, such that all of the second storage devices and all of the third storage devices are between the first and fourth storage devices, and the second storage devices alternate with the third storage devices along the line;

a first cable that directly connects the first connection interface of the first storage device to the first connection interface of one of the second storage devices that is closest to the first storage device;

a plurality of second cables, each of which directly connects the first connection interfaces of two of the second storage devices that are consecutively arranged along the line;

a plurality of third cables, each of which directly connects the second connection interfaces of two of the third storage devices that are consecutively arranged along the line; and a fourth cable that directly connects the second connection interface of one of the third storage devices that is closest to the fourth storage device to the second connection interface of the fourth storage device.

* * * * *